Sept. 5, 1933.   H. H. STEELE   1,925,344
COMBINED TYPEWRITING, COMPUTING, AND CHECK PROTECTING MACHINE
Original Filed Nov. 12, 1924   8 Sheets-Sheet 1

Inventor:
Herbert H Steele
By B.C. Stickney
Attorney.

Sept. 5, 1933.  H. H. STEELE  1,925,344
COMBINED TYPEWRITING, COMPUTING, AND CHECK PROTECTING MACHINE
Original Filed Nov. 12, 1924  8 Sheets-Sheet 2

Inventor:
Herbert H Steele
By B C Stickney
Attorney.

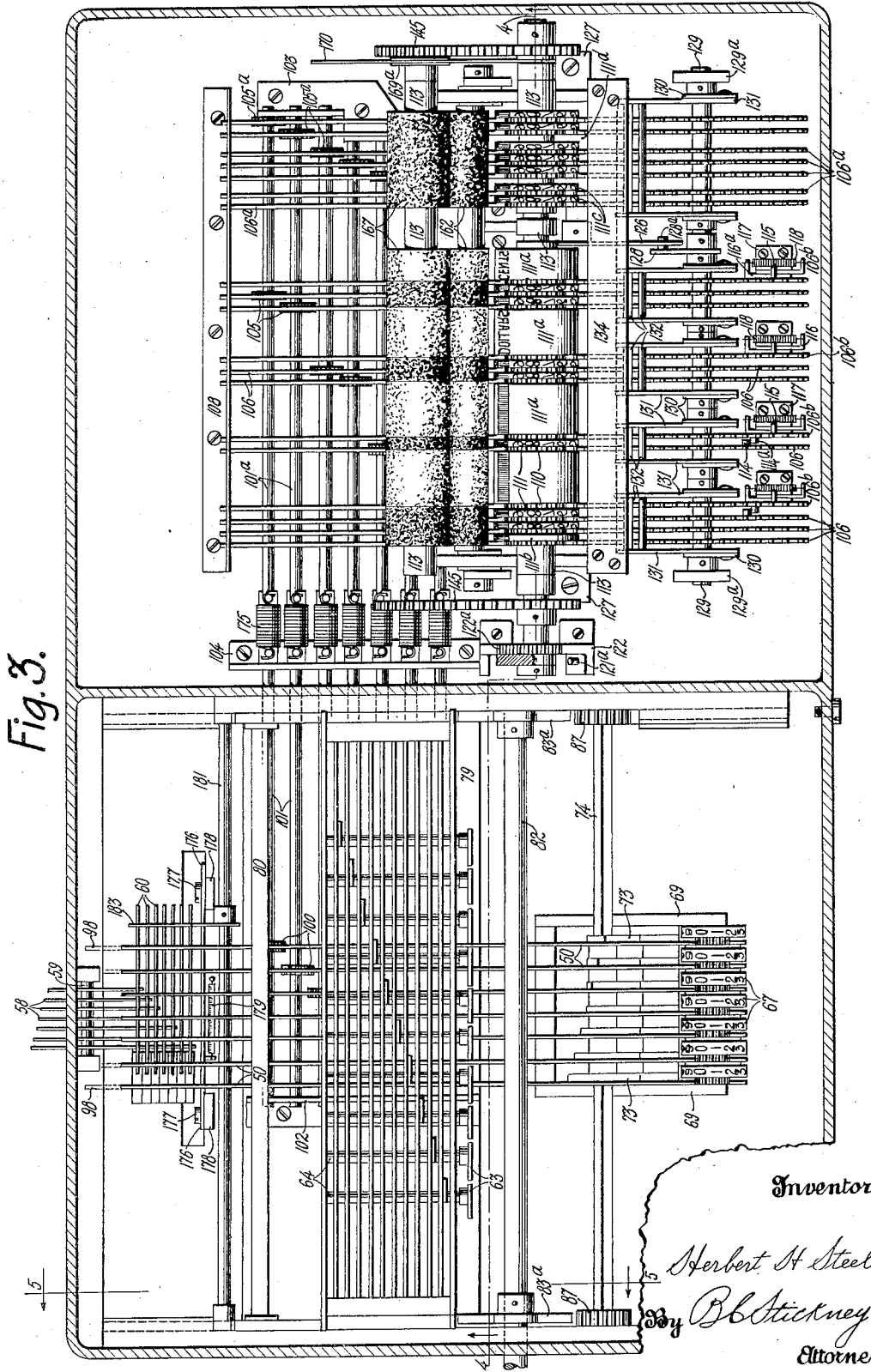

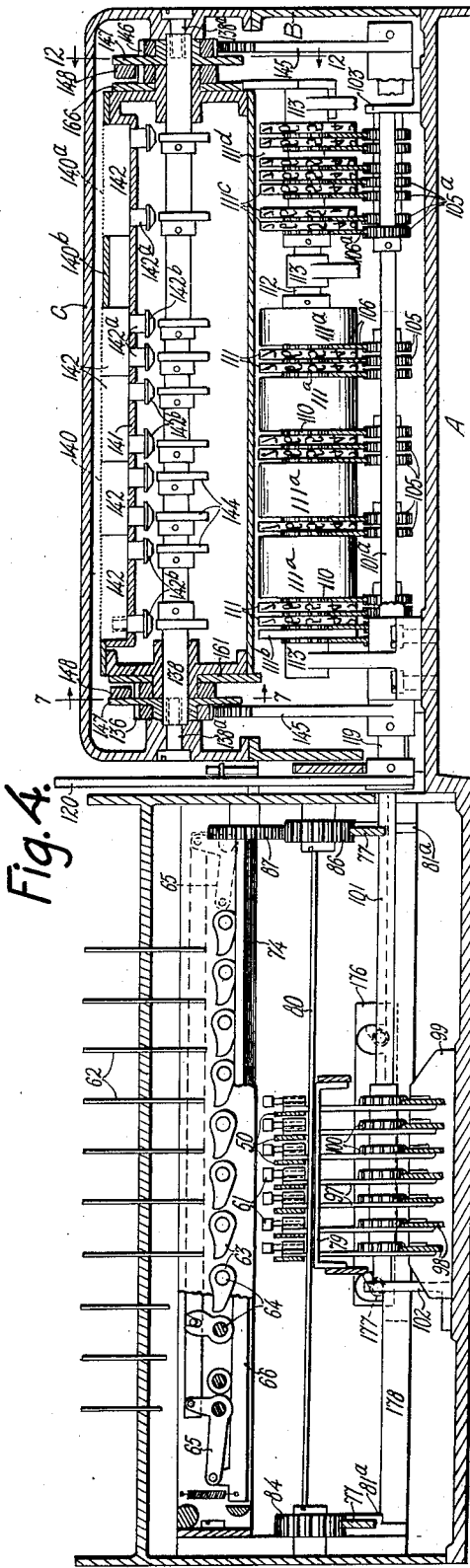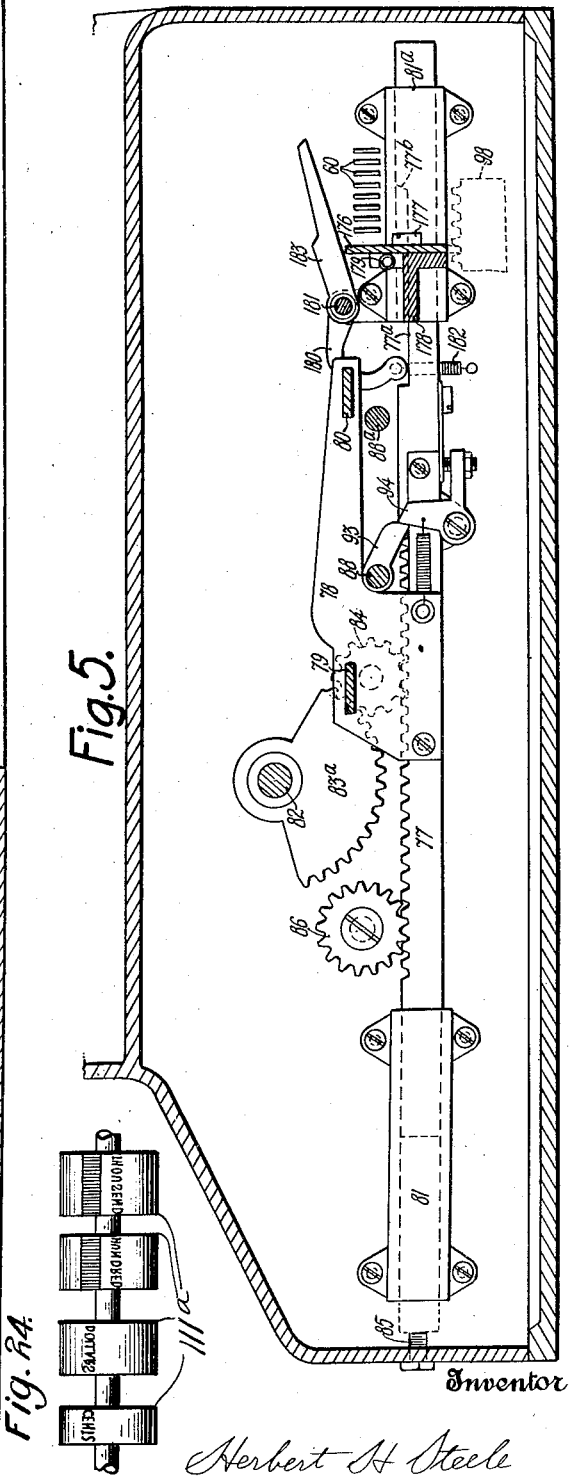

Sept. 5, 1933.  H. H. STEELE  1,925,344
COMBINED TYPEWRITING, COMPUTING, AND CHECK PROTECTING MACHINE
Original Filed Nov. 12, 1924  8 Sheets-Sheet 5
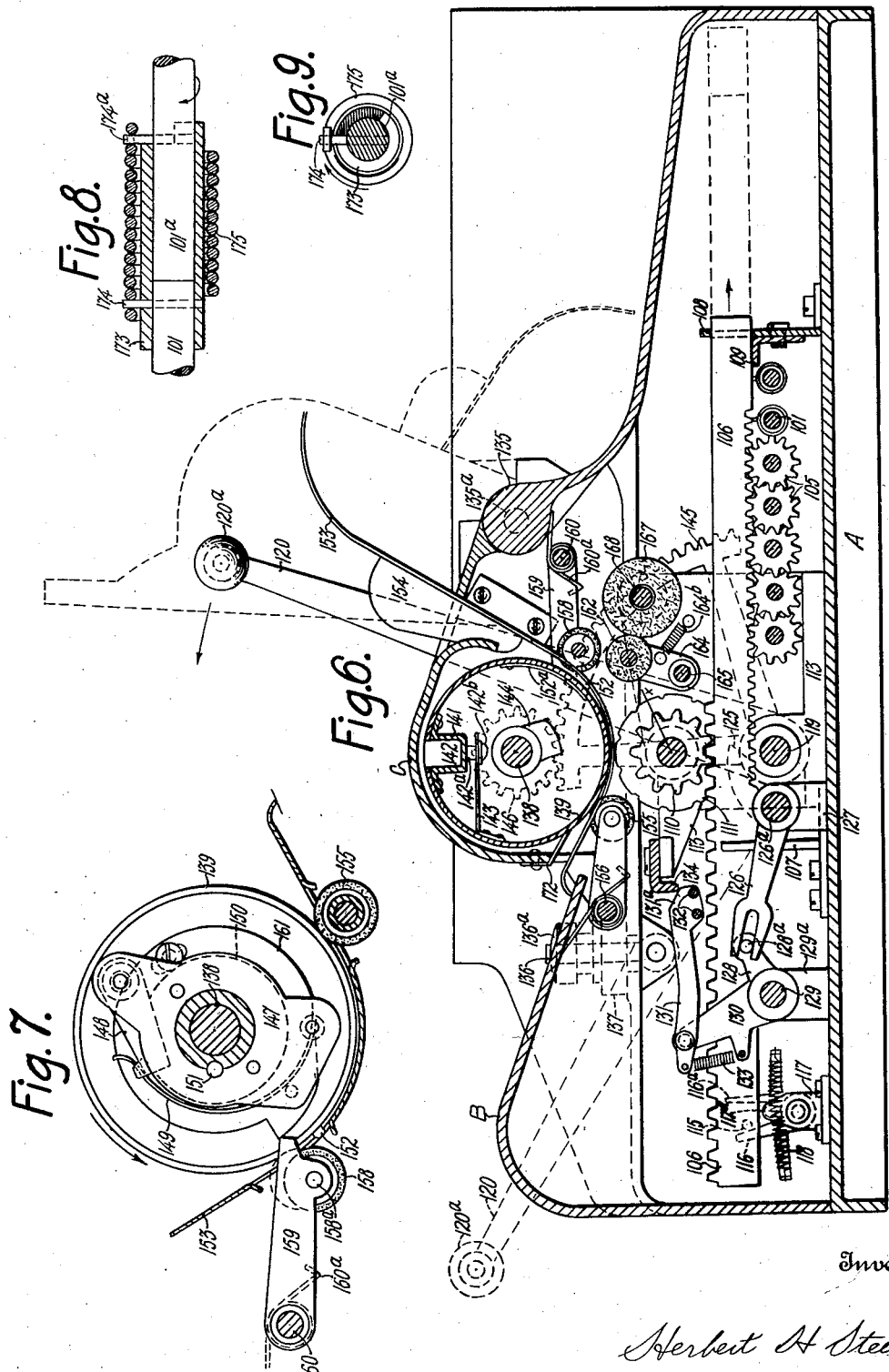

Sept. 5, 1933.  H. H. STEELE  1,925,344
COMBINED TYPEWRITING, COMPUTING, AND CHECK PROTECTING MACHINE
Original Filed Nov. 12, 1924   8 Sheets-Sheet 6
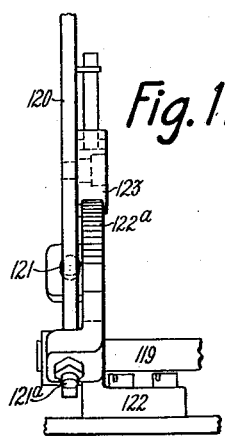
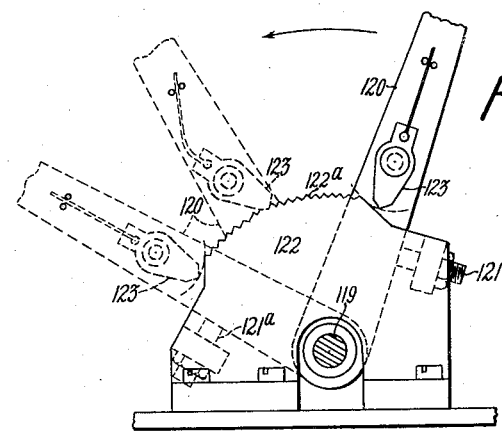
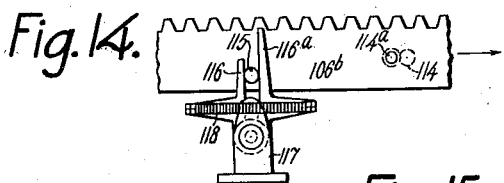
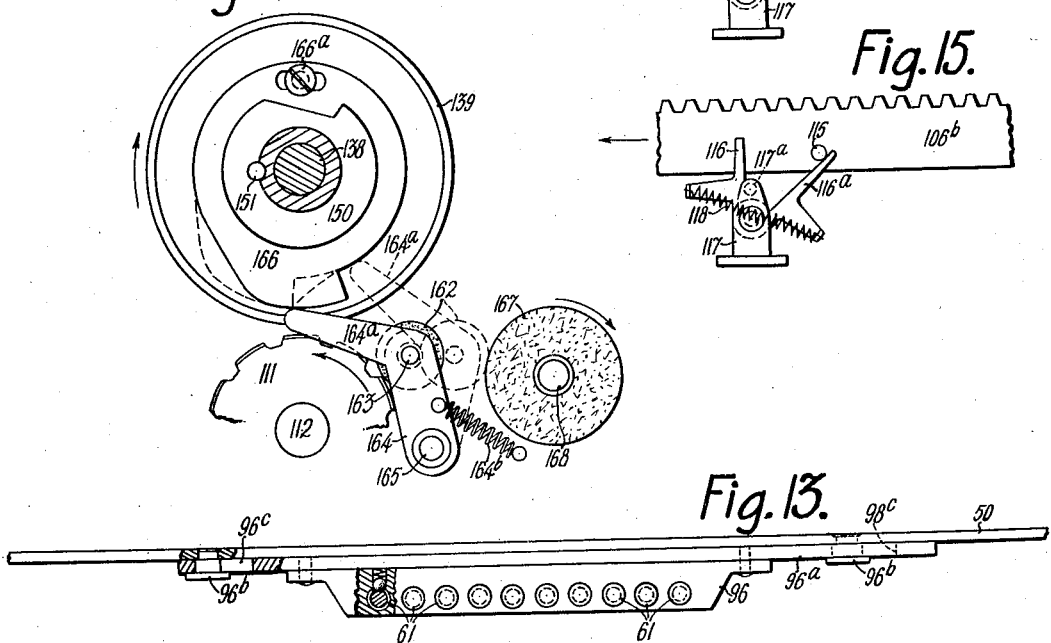
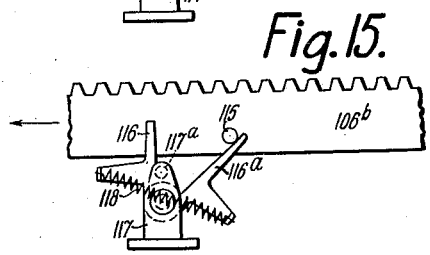
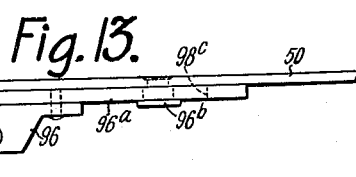
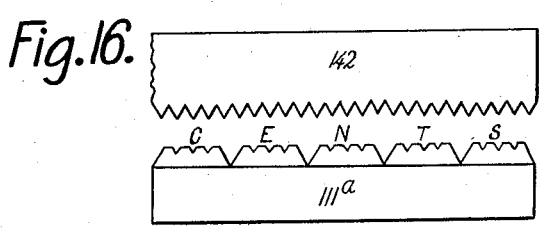
Inventor:
Herbert H Steele
By B C Stickney
Attorney Sept. 5, 1933.   H. H. STEELE   1,925,344
COMBINED TYPEWRITING, COMPUTING, AND CHECK PROTECTING MACHINE
Original Filed Nov. 12, 1924   8 Sheets-Sheet 7

Inventor:
Herbert H. Steele
By B. C. Stickney
Attorney.

Sept. 5, 1933. H. H. STEELE 1,925,344
COMBINED TYPEWRITING, COMPUTING, AND CHECK PROTECTING MACHINE
Original Filed Nov. 12, 1924   8 Sheets-Sheet 8
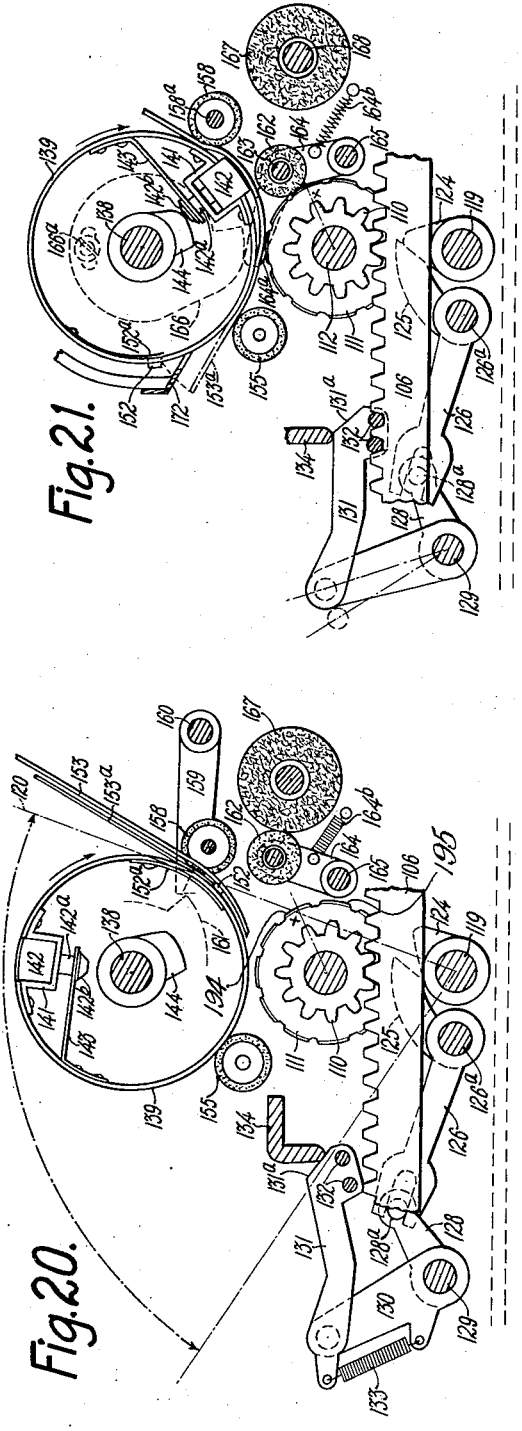
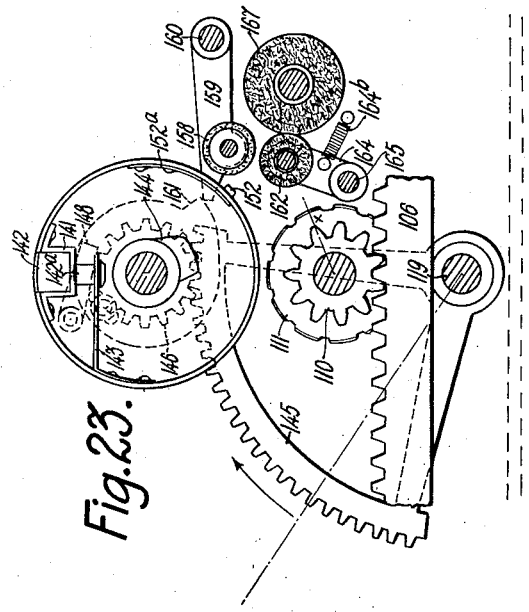
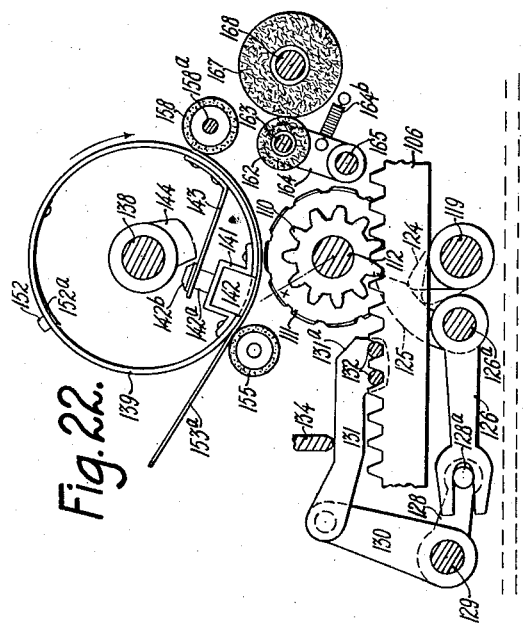
Inventor:
Herbert H Steele
By B C Stickney
Attorney.

Patented Sept. 5, 1933

1,925,344

UNITED STATES PATENT OFFICE 1,925,344

COMBINED TYPEWRITING, COMPUTING, AND CHECK-PROTECTING MACHINE

Herbert H. Steele, Lynbrook, N. Y., assignor, by mesne assignments, to Elliott-Fisher Company, New York, N. Y., a corporation of Delaware Original application November 12, 1924, Serial No. 749,401. Divided and this application December 10, 1927. Serial No. 239,081

65 Claims. (Cl. 197—1)

This invention relates to bank-check writing and is herein shown as applied to a combined typewriting and computing machine of the Underwood-Hanson type as disclosed in the patent to Hart, No. 1,190,171, dated July 4, 1916, where numeral-keys, when depressed to record a number, set up individual indexing pins, one for each printed digit; and the digits thus set and printed are later carried to accumulator-wheels that make up a register by a series of digit-bars operated by the carriage, each carrying a set of nine indexing pins that are individually settable to represent a preliminary denominational value.

In the present invention, the setting up of these indexing pins in the digit-bars by the numeral-keys in printing a number, and the subsequent movement of the bars to register their individual values on their associated accumulator-wheels, simultaneously register the same values upon a series of check-printing type-wheels that subsequently record the same values in a different form in dollars and cents upon the same work-sheet previously printed to set up these values.

The preparation of the weekly cash pay-roll in large corporations is a burdensome and costly addition to the over-head expense. The drawing of a pay-roll from the bank in mixed currency, separating it in small amounts, filling envelopes previously marked for identification and then distributing them, forced many of the railroads to adopt bimonthly pay-days. The development of the pay-roll check has changed all this, and today railroads and many large corporations are using the pay-roll check as a medium for a weekly settlement with their employees. In the preparation of these checks, the check is first typewritten for the insertion of date, payee's name and amount, and then some one of the many forms of check-writing protectors is employed as a separate operation to enter the amount in the body of the check, which must subsequently be signed or counter-signed.

These so-called check-writers are protective machines only and have no labor saving qualities, and as they do not preserve a record of the amount entered uopn each check, the final checking up of the machine-written-checks for a total to balance with the pay-roll record, opens up gaps for errors to creep in, and is still an expensive method.

In the present invention, the combined mechanisms produce a finished product, a check that is complete except for the signature. The typewriter prints the date, the payee's name and, at the right-hand end of the same line, the amount of the check in numerals, and, simultaneously with the printing of these numerals, automatically sets up similar denominational values in dissimilar forms; one form as a register where each check value is accumulated for a grand total, and the other form as printing elements that shred or emboss the set-up amounts in words and numerals by inked paper-cutting type-faces at the left-hand end of the amount line, and again in numerals only at the extreme right-hand end of the line; thus making three different amount-entries on the check, one typewritten, and two indelibly cut in the paper to provide for a greater protection against check-raising. Furthermore, the registering of the amount of each check at the register-wheels provides a total to balance with the pay-roll records, or if employed in a bank or a treasurer's office, provides a total for the day's transaction in disbursed funds.

In a combination machine of this character, the printing of a cipher by the typewriter adds nothing to the computing elements except a denominational position, but the value of this cipher must be transferred to the check-printing elements to print its denominational value on the check; and hence a general operator that transfers the set-up unit values in the digit bars to the register-wheels in units of "1" to "9" must simultaneously transfer an extra unit into the check-printing wheels to provide for the printing of the cipher on the check. To these ends each digit bar, which has heretofore carried nine index pins, in the present invention carries a series of ten index pins mounted within a shuttle-bar secured loosely to the face of each digit-bar to have a free and independent movement of one digit dimension, before any movement can be conveyed to said bar, and to have a positive connection to its check-printing rack-bar to move the latter distances of from one to ten digit-dimensions, but the digit-bar will only be operative from one to nine digit-dimensions, as heretofore.

Another feature provides for a two-color ink distribution to the paper-cutting faces of the type, that certain words may be written in one color on the check and certain numerals in another color for a contrast and quick reading of the amount.

Another feature provides for a rotary check-carrier with a normally inoperative paper-cutting platen and a series of normally inoperative paper-cutting type-elements, that at a predetermined interval in the carrier's movement rotate in synchronism with the carrier during a predetermined interval while the platen and type co-operate to shred the amount in words and numerals in the body of the moving check, and during a continuous rotation of the carrier.

Another feature provides for the setting up of the full amount in dollars and cents in a continuous line in both words and numerals by a key-manipulated type-printing operation, and for subsequently and simultaneously printing the full line of set-up cutting type-faces at a single operation.

Another feature is the timing of the inking element, that ink will only be applied to such typefaces that have been selected for printing on the check, and during the interval that the inking rollers are inactive, they engage with a larger rotating ink-supply roller to maintain a uniform distribution of ink.

The paper-cutting type-faces are coated with a thick indelible ink, which necessitates frequent cleaning to prevent smearing at the back of the check, and, for this purpose, the upper frame-section is hinged to swing back to give access to the cutting type-faces and to the paper-cutting platens for cleaning purposes.

Another feature consists of a series of rack-bars that move to a fixed-stop position to operate the register-wheels to register a predetermined value, and a second series of rack-bars that move in unison with the first series to set up a similar value on check-printing wheels; the two series of racks having a flexible connection that enables the check-printing racks to advance a predetermined distance in the same direction and independently of the register-racks, to print the set-up value on the check.

Paper mutilating check protectors, as heretofore described, in printing a small amount, like ten dollars, only mutilate a very short section of the amount line, and it has been an easy matter to erase this short printed section and substitute a new line for a larger amount in the unused area of the amount line.

Another feature of this invention provides for sectional inked paper-cutting elements for cutting a blank surface-destroying area through the entire length of the amount line on the check, and which elements are automatically displaced by word and numeral paper-cutting types predetermined by a key manipulation, thus mutilating the area not employed in writing the amount on the check, and effectively preventing any subsequent change in the amount, because it is a well-known fact that a type-cut surface on a check cannot be recut without detection.

Another feature consists of a normally-inoperative aligning device to bring the entire line of paper-cutting type-faces into longitudinal alignment after a key-manipulated assemblage and during their active period in printing the check.

Another feature consists of a rotary check-carrier having aligning fixed stops for the leading edge of the check, and a plurality of normally-inoperative feed-rolls that become effective to feed the check at the initial movement of the carrier.

This is a division of my application No. 749,401, filed November 12, 1924 (now Patent No. 1,858,027, dated May 10, 1932).

Other features and advantages will hereinafter appear.

In the accompanying drawings,

Figure 3 is a plan view of the computing and check-writing elements as though the top section of the frame had been removed.

Figure 4 is a longitudinal vertical section looking from the front at the line 4—4, Figure 3.

Figure 5 is a vertical section through the computing base indicated by the line 5—5 of Figure 3.

Figure 6 is a vertical section through the check-printing mechanism indicated by the line 6—6 of Figure 1.

Figure 7 is an enlarged view of the left-hand end of the check-carrier, on the line 7—7 of Figure 4.

Figure 8 is an enlarged detail view, in section, showing the manner of connecting the two sections of the rack-driving shafts for flexibility.

Figure 9 is an end elevation of Figure 8.

Figure 10 is a three-position view of the check-writing actuating lever and its means to enforce a full stroke in both directions.

Figure 11 is an end view of Figure 10.

Figure 12 is an enlarged detail view of the right-hand end of the check-carrier and the cam arrangement that controls the ink-distributing roller, on the line 12—12 of Figure 4.

Figure 13 is a detail top plan view, partly in section, of one of the accumulator-actuating rack-bars with the index-pin shuttle secured to the side thereof.

Figures 14 and 15 are positional views, showing the method of automatically bringing a word-wheel to the printing position when its co-operative figure-wheel is operative to print.

Figure 16 is an enlarged view of the paper-cutting type elements.

Figure 20 is a diagrammatic view showing the several parts of the check-writer positioned as when a check has been inserted at the rear and the carriage rotated to a point where the feed-rolls have just become effective to feed the check.

Figure 21 shows the check advanced by the carrier to a point where the cutting platen of the carrier is in position to move in unison with the cutting type-faces; the ink-roller against the printing sections; and the aligning elements in full engagement with the active racks.

Figure 22 shows the printing of the check completed; the ink-roller restored to its supply-roller; and the type-wheels locked while the check-carrier completes its revolution at the end of the forward stroke of the actuating hand lever.

Figure 23 shows the same parts at the end of the forward stroke of the actuating lever, when the check-carrier has made a complete revolution and the feed-rolls have been released and the check removed.

Figure 24 shows the word-bearing wheels 111$^a$ as they appear by looking at the machine from the rear and at Figure 20 from the right.

Figure 1:
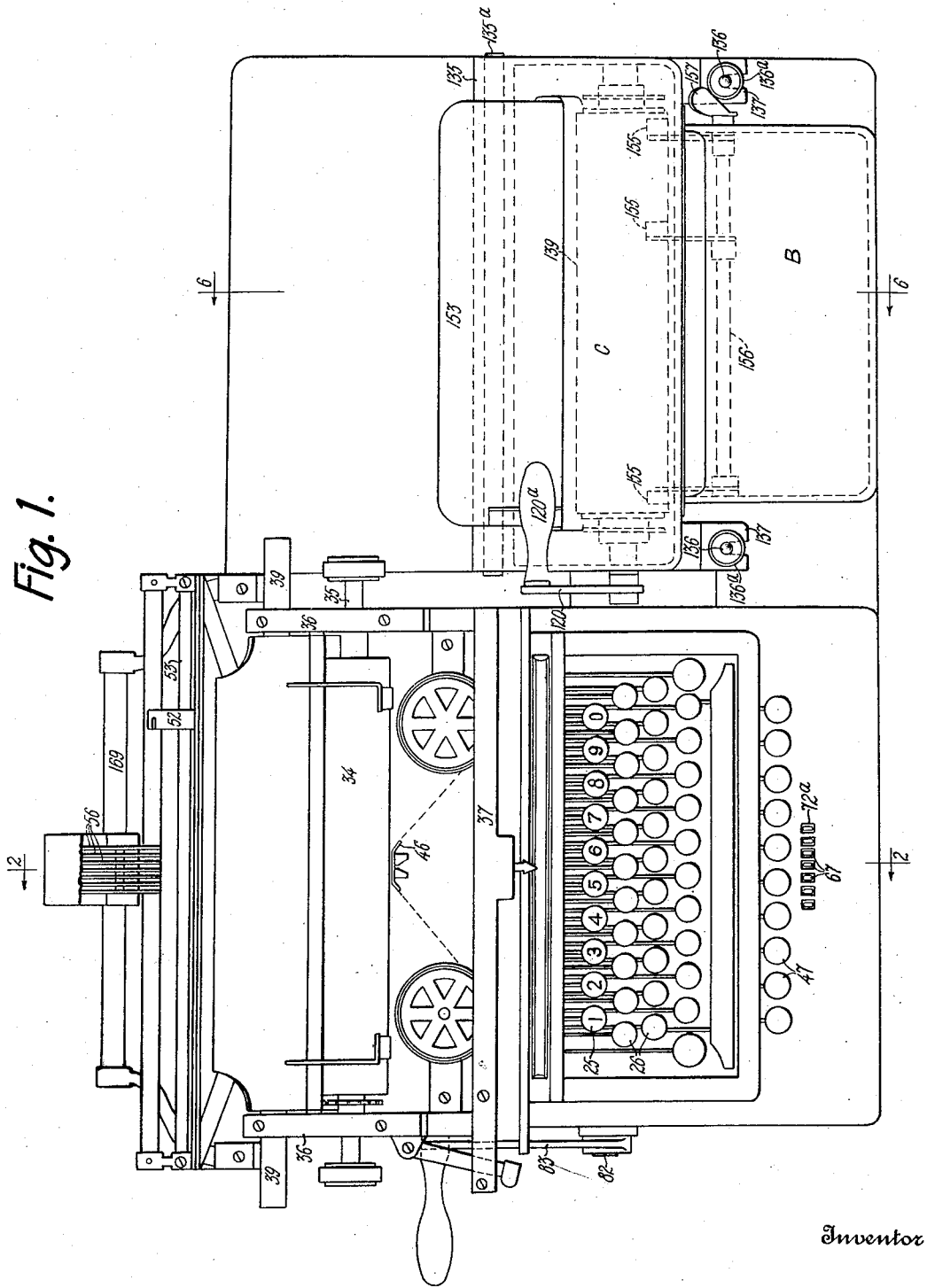
Figure 1 is a plan view of the well-known Underwood combined typewriting and computing machine arranged for co-operation with the check-writing attachment arranged at the side thereof, forming the subject-matter of this invention.

Numeral-keys 25 and alphabet-keys 26, when depressed, operate their key-levers 27 about a fulcrum rod 28 to vibrate bell-crank 29 about a fulcrum 30 and cause their associated type-bars 31 to swing upwardly and rearwardly about a fulcrum wire 32 to cause the type-faces 33 to print at a common printing point on the front side of a rotating platen 34 mounted upon a shaft 35 that takes end bearings in the two ends of a platen-frame 36 carried by a carriage 37 that moves from right to left upon guide-rods 38 and 39, respectively, under the influence of a spring motor (not shown) connected to the carriage. The step-by-step feeding movements of the carriage are controlled by the usual carriage feed-rack 40 pivotally hung from the platen-frame 36 and in mesh with an escapement-pinion 41 operated by an escapement-wheel 42, formed with the usual teeth to interlock with escapement-dogs 43ª mounted upon a rocker 43. Each type-bar is provided with a heel 44 that strikes a universal bar 45 to vibrate the rocker 43 at each type impact, to move the dogs 43ª into alternate co-operation with the wheel 42 for letter-spacing and also vibrate the ribbon-carrier 46 to raise the ribbon to cover the printing field just before each type impact.

The machine is provided with the usual decimal tabulator that includes keys 47 and denominational stops 47ª that co-operate with a stop 48 adjustably mounted upon a stop-bar 49 supported by the carriage.

The computing mechanism includes a series of index-pin-carrying bars 50, guided at the rear end by a comb-plate 51 and a transversely-slotted rod 51ª at the front ends, which are raised one at a time to an index-pin-setting position while the carriage traverses a computing zone.

Figure 2:
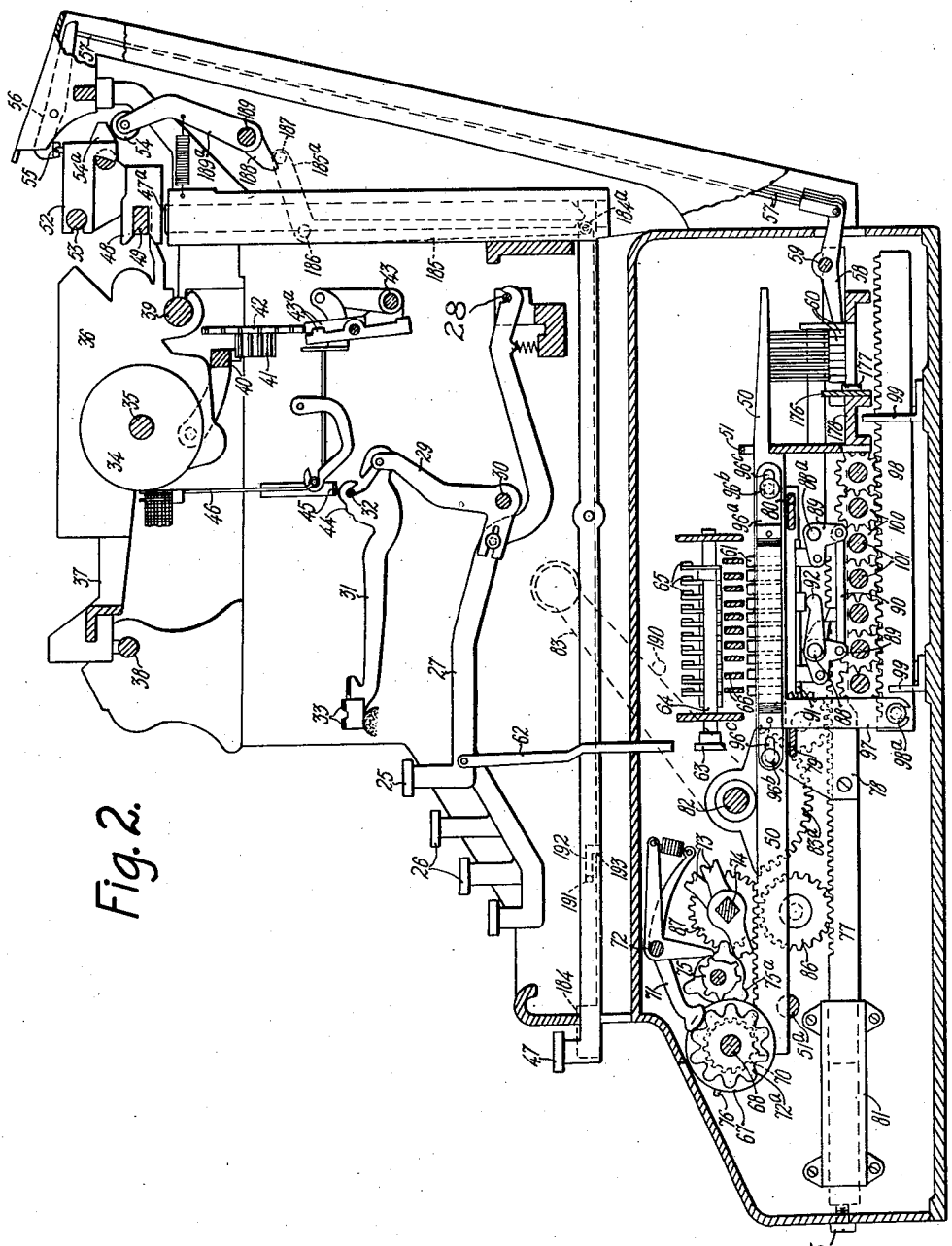
Figure 2 is a vertical longitudinal central section through the typewriting-computing machine on a plane indicated at 2—2 of Figure 1.

To selectively raise the pin-carrying bars 50 to pin-setting positions, the carriage is provided with selectors 52 adjustably mounted upon a cross-rod 53. When the carriage reaches the computing zone a roller 54ª of the selectors 52 rides upon a roller 54 centrally located upon the machine to bring a tappet 55 into co-operation with jacks 56 arranged above the roller 54. As the carriage moves through the computing zone, the tappet 55 engages with the jacks 56 one at a time to depress push rods 57 to rock levers 58 about a fulcrum 59, the inner ends of the levers (Figures 2 and 3) engaging with cross-bars 60 underlying the pin-bars 50; the levers 58 being so arranged that the extreme right-hand lever of the highest denomination will engage with the pin-carrying bar 50 at the extreme left, which is also the highest denominational position.

When a numeral-key 25 is depressed while one of the bars 50 is in its raised position, an indexing pin 61, that corresponds in value to the number of the numeral-key, will be set thereon and each pin is provided with a spring-pressed detent-ball, as shown at Figure 13, to lock it in a depressed position. Each numeral lever has a pendent finger 62 which engages with a crank-arm 63 to rock a shaft 64 and move links 65 to convey a vertical parallel movement to a pin-setting bar 66 (Figure 4) to depress a pin 61 on any pin-carrying bar to a pin-setting position.

Each register may comprise a series of decimal-order digit-bearing wheels 67 mounted for rotation upon a shaft 68, supported by side plates 69 of a bracket rising from the base of the casing. Gears 70 are loosely mounted at the side of each wheel and connected thereto by a ratchet and a one-way clutch (not shown) that mesh with the toothed upper edge of the bars 50. The wheels 67 are held against accidental movement by spring-pressed detents 71 mounted upon a transverse rod 72 and engaging with wheels 72ª fixed to the wheels 67.

The tens carrying is effected through a set of transferring elements 73, spirally arranged upon a square shaft 74, which rotate carry-over pinions 75 when a tooth 76 on any wheel 67 enters a carry-over position. Each carry-over pinion 75 has a three-toothed wheel 75ª connected thereto which engages with a wheel 72ª of the next higher denomination.

When the bars 50 stand in their normal positions, their index-pins 61 stand directly under their respective bars 66 and lie far enough below the same so that the depression of said bars will not engage the index-pins of the bars unless the rear end of a bar is raised by its decimal-order selecting lever 58.

A general operator, comprising a pair of rack-bars 77, Figure 5, side plates 78 fixed thereto, and a pair of transverse tie-bars 79 and 80, is mounted within the casing and arranged to move through suitable guides 81 and 81ª secured to the casing. The bar 80 normally stands a little to the rear of the rearmost index-pins 61 and at an elevation that it will pass forwardly under the lower ends of such index-pins as have not been forced downward or set but will engage any and all pins of the several bars 50 which have been set.

Mounted in suitable bearings in the side walls of the casing and extending above the bars 50, is an operating shaft 82 having a crank arm 83 at the left-hand end outside the casing, and having inside the casing segmental gears 83ª meshing with gears 84 that in turn mesh with rack teeth cut in the upper edge of the bars 77 of the general operator. Thus the general operator may be moved forward or backward by the movement of the crank arm 83 outside the casing, and the extreme forward movement of the operator may be adjustably limited by check screws 85 in the casing. The left-hand rack-bar 77 of the operator also is in mesh with a gear 86 rotating upon a screw threaded into the side frame, which in turn meshes with a gear 87 that drives the shaft 74 through a one-way clutch (not shown).

Such index-pins 61 as have been set in one operation must be restored at the end of the operation. A pair of rods 88 and 88ª extend transversely across the casing with their ends mounted therein; the rod 88ª being stationary and the rod 88 free to turn. Bell-cranks 89 joined together by a sleeve are mounted loosely upon each rod 88 and 88ª and connected together by a link 90, to convey a vertical parallel movement to the arms of the bell-cranks that are pivoted to ears depending from a pin-restoring plate 91 positioned to underlie the whole series of index-pins 61. The rod 88 has a short arm 92 to engage with the under side of the plate 91 to restore the index-pins, and as this operation must take place at the extreme end of the general operator's return movement the rod 88 is provided with a cam-arm 93, Figure 5, operated by a spring-pressed dog 94 pivotally hung from the bar 77 of the general operator that cams the arm 93 at the extreme end stroke of said operator, and on the initial forward stroke of the operator the dog 94 will snap under the arm 93 without effect.

This description up to this point covers briefly the Underwood-Hanson computing mechanism, further details of which may be had from the Hart patent referred to.

In the computing mechanism just described, each bar 50 carries a series of nine index-pins, because in printing a cipher nothing is added to the register except its denominational value, which is automatically registered by the letter-spacing movement of the carriage to the bars 60, but in simultaneously setting up the equivalent amount in an adjoining mechanism arranged to print the amount upon a bank check the cipher must be set up and printed. For this reason, each bar 50 carries a series of ten index-pins 61, and the movement of the general operator in advancing said bars through a ten-pin movement would upset the whole computing mechanism adapted only for a nine-point movement. It is necessary therefore from a fixed movement of the general operator to transmit a ten unit dimension to one mechanism and a nine unit dimension to the computing mechanism. To this end, the ten index-pin block is not rigidly fixed to the index-bars 50 as heretofore, but said block is fixed to a plate 96a that is secured to the face of the bar 50 by large-head, shouldered rivets 96b that pass through slots 96c in the plate 96a to guide said plate and its block of pins for limited longitudinal movements independently of the bar a distance equivalent to one index-pin spacing unit, and operates as a loose shuttle along the bar to be moved one unit distance at the initial movement of the cross-bar 80 before movement is conveyed to the bar 50, and at the initial general operator's return stroke said shuttle is moved rearwardly by the cross-bar 79 engaging an arm 97 pendent from the plate 96a a one point unit distance before the bar 50 is picked up and carried rearwardly to be arrested by the comb-plate 51. Thus from a uniformly fixed movement of the general operator the pin-carrying shuttle has a variable movement of from one to ten unit distances, and from the same movement of the operator the bar 50 has an operative movement of from one to nine unit distances.

The arm 97 that is pendent from each plate 96a of the pin-blocks 96 (see Figure 13) may terminate at an open slot to embrace a rivet 98a projecting from the side face of the forward end of a rack-bar 98 held in a vertical relation under each bar 50 by suitable comb-plates 99 secured to the base of the casing. When any pin-block 96 is moved by the bar 80 of the general operator, the arm 97 will convey a similar movement in two directions to its associated rack 98, and said rack, like the pin-blocks, will have an extreme movement equivalent to a ten unit distance.

The object of the rack-bars 98 is to convey an equivalent movement of the pin-blocks to an adjoining machine. Hence each rack-bar is in mesh with a transmission pinion 100 secured to a shaft 101 positioned transversely above the racks 98. In the typewriting element, provision is shown for an adding zone of seven digits, with seven jacks 56 operating seven levers 58 and seven index-pin-bars 50. Hence there are seven shafts 101 that lie in parallel horizontal planes above the racks 98, and the pinion 100 secured thereto is positioned to align with the rack position. These seven shafts take an end bearing in a bracket 102, Figure 3, secured to the base of the computing casing and extend rightward to traverse the adjoining check-printing casing where the ends take a bearing in a bracket 103. As these shafts are long and comparatively small in diameter, an intermediate bracket 104 gives a center support for the seven shafts, which are divided into two sections, one section 101 within the computing casing and the other section 101a within the check-printing casing. This division is made for purposes presently to appear.

These seven shafts within the check-printing casing carry a pinion 105 similar to the pinion 100, and each is in mesh with one of a series of seven rack-bars 106 guided by a front comb 107 and an adjustable rear comb 108. The operative movement of the bars 50 is towards the front of the machine for computing purposes, where the reading of the register-wheels 67 is convenient to the operator's position. The rack-bars 106 have an operative movement towards the rear; hence the transmission from the bars 50 through the shafts 101 and 101a requires that the pinions 105 shall mesh with rack-teeth cut on the lower edge of the bars 106, and to promote a free sliding movement of the bars through the comb 108, a shoe-plate 109 adjustably secured to the comb provides a wide bearing surface to engage with the face of the teeth.

The forward upper edges of each bar 106 provide a second toothed rack that is in mesh with a gear 110 secured to a type-printing numeral-wheel 111 mounted upon a stationary shaft 112 suspended by three brackets 113, Figures 3 and 4, secured to the base-plate of the frame. Each type-printing numeral-wheel 111 that is in mesh with a rack 106 has eleven raised type-faces equally spaced circumferentially around the periphery of the wheel; ten of these types include the ten numerals "1" to "0" and the eleventh type a surface-destroying unit for purposes presently to appear. As shown at Figures 3 and 4, the numeral-bearing wheels 111 are positioned on the shaft 112 to co-operate with four word-bearing wheels 111a, one carrying the word "cents", another "dollars", a third "hundred" and a fourth "thousand", with two numeral-wheels 111, Figure 3, are located normally in "cents" and "dollars", two between "dollars" and "hundred", one between "hundred" and "thousand", and two between "thousand" and the outside destroying unit wheel 111b; the series of eleven numeral and word wheels have a capacity to print any amount up to 99 thousand 9 hundred and 99 dollars and 99 cents in numerals and words, and these wheels are grouped together to print at the left-hand portion of the amount line of a check. It is also the purpose of this invention to duplicate the amount by printing it a second time in numerals only at the extreme right-hand end of the amount line on the check, and for this purpose it will be noted at Figure 3 that each shaft 101a carries two pinions 105 and 105a, the latter engaging with rack-bars 106a that operate a series of seven digit-bearing wheels 111c that are a duplicate of the wheels 111. These seven wheels are grouped together, and to eliminate punctuation between denominations a wide gap 111d is provided between "dollars" and "cents" and between the "thousandths" and "hundredths" positions.

The surface-destroying unit on the two left-hand word-wheels 111a and the words "dollars" and "cents" on the third and fourth word-wheels 111a, Figure 3, are located normally in line in the peripheral position 194, Figure 20, while the zero-characters on all the numeral-wheels 111, 111c and 111d, Figure 3, and the words "hundred" and "thousand" on the two left-hand word-wheels 111ª are located in the position 195, Figure 20.

All the numeral-wheels 111 and 111ᶜ, as just described, are rotated by racks 106 or 106ª controlled by the rotation of the pinions 100 and shafts 101. The four word-wheels 111ª and the end wheel 111ᵇ are also rotated by a rack 106ᵇ similar to the racks 106, but have no pinion driving connections to the shafts 101ª, and the control of these four wheels by their racks has a distinct function presently to appear.

The word-wheels "hundred" and "thousand" are brought to the setting-up-line position when required, and are under the control of the numeral-wheels at the left hand. Thus when 600.00 is set up by the typewriting machine to the computing elements, the denominational unit position of the "6" will be established by the associated printed ciphers to set up the type-wheels 111ᶜ in proper order, but in the series of wheels 111, the word-wheel "hundred" must be brought into printing position not by the ciphers but by the adjoining wheel carrying the "6". The rack 106, operating the numeral-wheel to the left of the "hundred" wheel, Figure 3, has a pin 114 set into the face thereof that interlocks with a similar pin 114ª projecting from the face of the rack 106ᵇ operating its "hundred" wheel, Figures 3, 14 and 15. Hence if the rack 106 is moved rearwardly to the "6" unit position, the pin 114 will release the pin 114ª to the action of a spring 118 to automatically move the "hundred" wheel 111ª one point to the setting-up line to supersede the blank type unit. By adjusting a second pin 115 on the opposite side of the rack-bar 106ᵇ that is under the control of two oppositely-disposed arms 116 and 116ª pivoted to a bracket 117 on the base and having distended arms connected by the spring 118 to draw the arms 116 and 116ª together against a pin 117ª in the bracket 117, said rack 106ᵇ will move from the position of Figure 6 to that of Figure 14, and the associated wheel 111ª will rotate one unit distance to bring the word "hundred" automatically to the setting-up position, and upon the return stroke of the rack 106 the pin 114 will pick up the pin 114ª and swing the word "hundred" back to inoperative or non-aligning position. The wheel carrying the word "thousand" operates in a similar manner, and while the "dollars" and "cents" wheels are also shown provided with spring-pressed fingers 116 and 116ª, their function is entirely different, as will presently be seen.

119 indicates a driving shaft having end bearings within the brackets 113 and operated by a crank-arm or operating lever 120 secured to one end of the shaft to pass upwardly through a gap between the two frames and the free end provided with a handle 120ª. This arm 120 swings between two adjustable stop positions, indicated at 121 and 121ª (Figure 10) as set-screws threaded through ears on a bracket 122 secured to the base adjacent the lever, and formed with fine arcuate V-teeth 122ª across the upper edge to co-operate with a two-way spring-pressed dog 123, pivoted to said lever to overhang the toothed edge of the bracket to force a complete movement of the lever in both directions when once started, commonly known as a full-stroke mechanism.

The drive shaft 119 is approximately directly under the wheel shaft 112, and, at a point where a gap is formed between the series of wheels 111 and 111ª and the series of numeral-wheels 111ᶜ, a cam 124 is secured to the shaft 119 to operate a short arm 125 of a lever 126 hung upon a shaft 126ª supported by two ears formed at the side edges of a bracket 127. The lever 126 is bifurcated to engage with a stud 128ª on a short crank-arm 128 secured to a rock-shaft 129 that extends across the machine under the whole series of rack-bars 106, 106ª and 106ᵇ where the ends take bearings within upright ears 129ª rising from the base-plate. Referring to Figure 3, it will be noted that the racks 106 and 106ᵇ occupy grouped positions, due to the wide word-wheels on the shaft 112, and each group is provided with individual aligning elements, which though separated as separate units all operate in unison to bring the whole series of nineteen word and numeral wheels into a straight line during the printing operation as follows: A pair of arms 130 have hubs that are pinned to the shaft 129 and the upper ends of both arms are pivotally connected to one end of links 131 that extend forwardly at either side of each group of bars 106 and 106ª, and the free ends are joined by two tie-rods 132, spaced relatively to each other a dimension equal to the pitch or the distance between two adjoining teeth of the racks 106 and normally raised above the racks by a spring 133 secured between a short arm of the link 131 and an ear on the arm 130. The forward upper ends of the links have a cam face 131ª operative to co-act with a round nose cam-bar 134 fixed at each end to the brackets 113 to overhang the whole series of links 131. From this description, it will be seen that when the lever 120 is drawn forward the shaft will rotate, and at a predetermined point (Figure 21) the cam 124 will pick up the crank-arm 126 to vibrate the arm 126 downwardly to rock the shaft 129 and cause all the links 131 to move forwardly, and through the abutment of the stationary cam-bar 134 against the advancing cam-faces 131ª, the links 131 will be forced downwardly against the tension of their springs 133 and this downward movement is so timed that the two cross-rods 132 will drop between adjoining teeth of the racks 106 to bottom therein, and as the forward movement of the links continues the cam-bar 134 will ride over the upper straight edge of the links and effectively lock the rods within the teeth of the racks (Figure 22) during the remainder of the movement, and the cam 124 will enter upon a dwell-face on the crank-arm 125 to the end of the stroke of the arm 120. This interlocking between the rods 132 and the teeth of all the racks causes said racks to move forwardly in unison therewith to vibrate the whole series of wheels a predetermined number of unit distances, and at the same time correct any positioned variation in the wheels by forcing them individually into alignment. As previously set forth, each number-wheel 111 has eleven printing units and the associated gear has eleven teeth, which provides for comparatively large teeth and a proportional wide gap between the teeth of the co-operating rack-bars 106, and enables a fairly large rod to be employed to withstand the strain of operating the racks and wheels.

Directing attention to Figures 1, 4 and 6, the casing of the check-writer may be divided into three sections, the base "A", the enclosing casing "B" and a hood "C" that covers the printing elements. The hood and casing are formed with interlocking lugs 135 pivotally tied together by a fulcrum-rod 135ª, and the hood may be locked down at the front side by eyebolts 136 pivoted to the casing and positioned at each side to pass within the slots of two ears 137 projecting from the hood and be clamped to the casing by thumb-nuts 136ª. The hood is formed with end walls that provide bearings at each end for a shaft 138 as by partially entering the hubs on the inside of the hood and secured to the hood at each end by screws 138ª in such a manner as to prevent rotation of the shaft. Upon this stationary shaft 138 and within the hood a check-carrier 139 is mounted comprising a cylinder or tubular section with heads at each end having interior and exterior hubs to provide a long wearing surface on the stationary shaft. The tubular section is formed with two longitudinal slots 140 and 140ª extending from head to head with a short bridge section 140b between what corresponds to the gap between the series of word-wheels 111ª and the series of numeral-wheels 111c, and indicates an unused section of the amount line of the check. A U-shaped channel-piece 141 has side flanges secured to the inner face of the cylinder, with side walls that align with the edges of the slots and provide a continuous housing on three sides for a series of platen-sections 142 that normally are flush with the periphery of the cylinder. Each platen-section 142 has two shouldered studs 142ª that pass from the lower face of the platen down through a clearance hole in the adjacent wall of the housing, where the free ends terminate at a large head 142b that is flat on the side towards the housing to receive the forked ends of the spring comb-bar 143 secured to the inner face of the cylinder. Within the rotary field of each stud 142ª, a cam 144 is fixed to the stationary shaft 138 at a predetermined point, and the lower ends of the studs 142ª contact with their respective cams 144, and the associated platen-sections are raised above the periphery of the cylinder and held there by a dwell on the cam for a predetermined interval and then ride off the cam and are restored by the individual springs 143 to bottom within the housing with the outer faces of the platen-sections flush with the face of the cylinder.

To transfer a rotary movement to the cylinder 139, the operating shaft 119 carries a gear 145 at each end that is in mesh with a pinion 146 fixed to a flanged hub 147 rotating freely on the shaft 138 and carrying a pawl 148 pivoted thereto, Figure 7, that is urged toward the shaft by a spring 149 secured to said flange. The pawl 148 interlocks with a disk 150 having a single tooth formed in the edge thereof and secured to the hubs of the cylinder by a pin 151. The forward movement of the arm 120 swinging between its two stop positions 121 and 121ª rotates the cylinder 139 through one complete revolution or cycle through the forward movement of the pawl 148 driving the disk 150, and, when the movement of said arm is reversed, the pawl will leave the disk 150 and cylinder 139 at a position where the pawl will re-engage the disk at the end of the return stroke; hence the carrier 139 makes a complete cycle on the forward stroke and remains inactive during the full return stroke of the arm 120.

The check-carrier has two leading-edge-aligning stop-pins 152 which are carried on the ends of two flexible flat springs 152ª secured to the inner wall of the cylinder with the pins passing through clearance holes in the wall thereof to project slightly beyond the outer face of the cylinder.

A paper-deflector 153, secured to the inner end walls of the hood C, passes through an opening in the top wall with the forward end curving around the under side of the carrier 139 where the free ends overlap the edge of the front apron of the casing, to guide the work-sheet with portions of the deflector cut away to allow clearance for the platens 142. The check may be further guided by a side-edge gage 154 secured to the left-hand side of the deflector.

The paper-feeding means co-operating with the cylinder 139 comprises three rollers 155, Figures 1 and 6, which bear against the face of the cylinder 139 in front of the printing wheels 111, and which may be flexibly mounted individually upon a rock-shaft 156 that has bearings at the side walls of the casing, the free right-hand end passing through the casing and provided with a finger-piece 157 to release all three rollers from pressure against the cylinder face when desired.

Another feeding element, intermittent in its operation, comprises three rolls 158 mounted for rotation upon a rod 158ª fixed at both ends to side arms 159, which in turn are secured to a rock-shaft 160 journaled in the brackets 113, the rolls being urged through openings in the deflector 153 toward the cylinder 139 by a spring 160ª. Were the rolls normally in contact with the cylinder 139 and a sheet of paper inserted therebetween with nothing to force it inwardly except its own weight, the rotating of the cylinder might effect an immediate grip on the paper, or the grip might be delayed an instant and change the writing-line position, or the grip might first take effect at one corner and result in an angular entry, or the paper might not enter at all. All these uncertain features would disfigure a semi-finished check. To obviate these uncertain factors, the feed-rolls 158 normally are cammed away from the face of the cylinder and the insertion of the check allows the leading edge to pass between the cylinder 139 and rolls 158 to the position of the stop pins 152, and the initial movement of the cylinder releases the rolls 158 to be spring-pressed against the face of the check to the rear of the leading edge, and hence a positive gripping feed of the check through the printing wheels is effected. To this end a cam-plate 161, Figure 7, is secured at the left-hand end of the cylinder between the head and the disk 150 that engages the inner end of the adjacent arm 159 at the end of the forward stroke of the arm 120, which provides an entering space between the rolls and the cylinder, and at the initial forward stroke of said arm 120 the rotation of the cylinder in the direction of the arrow in this figure will release the rolls to the action of the spring 160ª and paper-feeding will take place immediately. The forward movement of the crank-arm 120 conveys a full revolution to the cylinder 139, and at the end of the forward stroke of said crank-arm the cam-plate will force the rolls 158 to the inoperative position of Figure 7. The check has been printed and if the movement of the cylinder does not eject the check, there is nothing to prevent it from being withdrawn by the hand except the pressure from the rolls 155, which may be released by the fingerpiece 157 and the check withdrawn. It will be noted that the rolls 155 are positioned to engage at the two edges of the check and that the middle roll is positioned to the blank space between the two series of type-wheels; otherwise the middle roll would track through the printed line and smear the check.

The linking elements consist of a roller 162 made up in sections that rotate freely upon a rod 163 carried by two side arms 164 that are fixed to the end of a rock-shaft 165 journaled in the two outer brackets 113. The arm 164 at the right-hand end, Figure 12, has a finger 164ª that enters the sweep of a cam-plate 166 adjustably secured to the adjacent head of the cylinder 139 by a screw 166ª passing through an elongated hole in the plate and threaded into the cylinder head, providing means to advance or retard the cam, for purposes presently to appear. The rolls provide ink for the type-faces of the printing type-wheels, and, as shown at Figure 3, the sections are arranged for the grouping of the type elements to provide ink of one color for the numeral-wheels and ink of another color for the word-wheels, or they may all be a uniform color is desired. The rolls 162 are comparatively small in diameter and made of felt, and their capacity for saturation is limited; hence an ink-supply roller 167, also of felt and made up in sections, is carried by a shaft 168 journaled in the two end brackets 113. The rolls 162 are urged towards the larger rolls 167 by a spring 164ᵇ connected between a spring stud on the arm 164 and a similar stud on the bracket 113 at each side, and when the rolls 167 are rotated by the shaft 168 the rolls 162 roll over the surface thereof and a uniform density of ink is maintained in the smaller roll. To provide a rotary movement for the shaft 168 and its rolls 167, one end of said shaft outside of the bracket 113 may be provided with a toothed ratchet-wheel 169, Figures 18 and 19, enclosed on two sides by disks 169ª to retain and guide a ratchet-toothed rack-bar 170 pivotally connected to the face of an arm of the gear-sector 145 and engaging the wheel 169 in one direction by its own weight and riding over said wheel to follow the fixed radial movement of its pivot in the sector. When the sector moves forward, the bar 170 rides over the teeth of the ratchet-wheel 169, but on the return stroke the rack teeth will interlock with the teeth of the wheel and convey a rotary movement to the shaft 168 and roller 167, which in turn will rotate the rolls 162 through surface contact influenced by the springs 164ᵇ.

The numeral-wheels 111 have eleven printing units distributed around the rim of the wheel at uniform distances; one unit for each of the numbers "0" to "9" and one blank surface-destroying unit. The surface-destroying unit of each number-wheel is normally positioned at a setting-up line position, where any and all of the selected type-faces are prematurely grouped and subsequently advanced to the printing position as a whole-line-unit. As every check made out is in dollars and cents, these two words may be in permanent alignment with the surface-destroying units, but the two word-wheels for "hundred" and "thousand" have a surface-destroying or blank unit in alignment with this setting-up line position when the amounts selected are below their denominational value. Every check that is printed employs the whole linear series of printing elements that cover the entire length of the amount line, and when an amount in numerals and words is selected by the adding elements these selected units displace corresponding surface-destroying blank units, and hence such portions of the amount line not used by the amount units in numbers and words will be destroyed by the blank units to prevent the surface from being used a second time to make any changes in the original line of print. To print the entire length of the amount line simultaneously and at a single operation with inked paper-cutting type-faces on the face side and a co-operative cutting platen on the opposite side of the check, would require more force than a manually-operated office appliance should have. Furthermore, such surface-cutting elements do not actually shear their way through the paper, but tear or shred the surface, and by applying ink to the raw edges of these tears or rents, it makes it more difficult to remove the ink by any form of eradicator. To promote an easy printing operation, instead of bringing the whole longitudinal face areas of the types against the check at the same instant, the check is rolled between two rotary cutting elements and a shearing effect is obtained which greatly reduces the burden carried to the operating crank-arm 120.

Referring to Figure 16, it will be noted that the platen sections 142 have transverse sharp V-cutting teeth throughout their length, and that these teeth align with V-grooves cut across the type-faces indicating in this figure the letters cents. As the type-faces are printing faces, a flat type-face section is preserved between each V-groove as an ink-carrying surface. As the type-wheels 111 and 111ª are mounted upon the shaft 112 for a free running fit without unnecessary end motion, it would be practically impossible to cut a continuous platen-bar with V-teeth that would align perfectly with the grooves in the whole series of wheels 111; hence the platen-sections 142 are provided with slight endwise movements, as indicated by heavy lines for a slight clearance space between adjoining platen-sections at Figure 4, which permit the teeth of the individual platen-sections to adapt themselves to the grooves in the wheels for cutting alignments.

Figure 17:
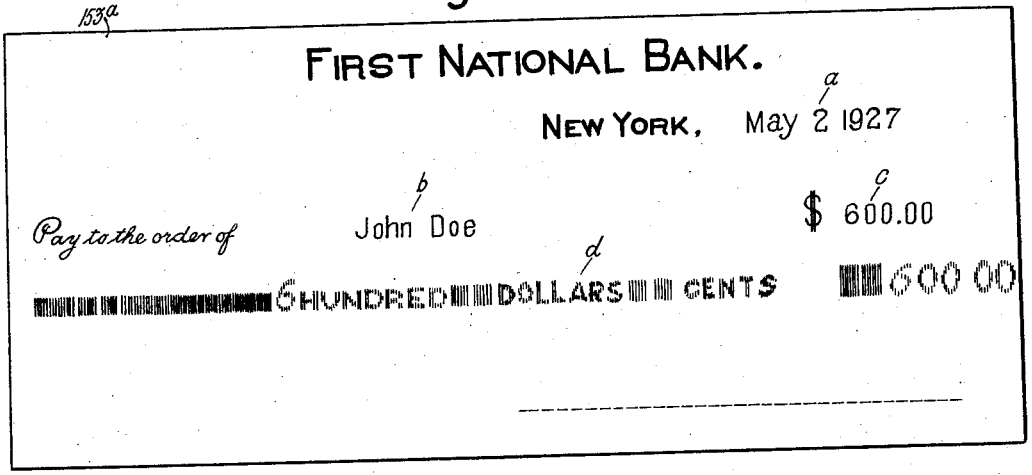
Figure 17 illustrates a blank check filled in by the typewriter and check-writer in a manner according to this invention.

The operation of this combination machine is as follows: A blank check 153ª, shown at Figure 17, is adjusted to the typewriter platen 34 and the date indicated at "a" is typed; the payee's name entered at "b" and the amount "c" of the check typed on the same line as shown. In printing the amount "600.00", the numeral-keys 25 on the typewriter depress the fingers 62 that operate the rock-shafts 64 to depress their bars 66, which in turn depress the underlying index-pins 61 in their respective index-bars 50. The crank-arm 83 is drawn forwardly, and the cross-bar 80 will move forwardly and pick up these pins that have been depressed and move their associated indexing bars in unison therewith to the end of the stroke as their denominational positions may indicate. One index-pin will be moved through seven units of space and will move its associated indexing bar through six units to set up the six position on its index wheel. The other four depressed index pins will move through one unit distance and not affect their index-bars 50. The movement of the first pin through seven unit spaces will carry its rack-bar 98 the same distance, and rotate its pinion 100, shaft 101 and the two pinions 105 and 105ª to move the racks 106 and 106ª a seven unit distance to rotate their numeral-wheels 111 and 111ᶜ to bring the numerals "6" to the setting-up line position, one numeral "6" before the word "Hundred", whose wheel has been released, and one at the denominational hundreds position in the wheels 111ᶜ. Printing the four ciphers will set up four pins 61, and near the end of the stroke of the crank-arm 83 the bar 80 will pick up these four pins and move them one unit distance by moving their shuttles 96 and not disturbing their racks 50; and this one unit movement of these four shuttles will rotate their shafts 101 to move the racks 106 and 106ª to cause ciphers to supersede the destroying units of print in the setting-up line position.

The denominational position of the "6" is hundreds, and the rack 106, in moving rearward through the first unit distance, will release the rack 106ᵇ to the action of the spring 118, and the pin 115 will move from a position shown at Figure 6 to that of Figure 14, where the rack is arrested and locked by the stud 115 between the two arms 116 and 116ª, which automatically shifts the surface-destroying blank type-face to bring the word "Hundred" into alignment with the setting-up position, and, as already described, the setting up of an amount in the word line simultaneously sets up plain numerals in a second group 111ᶜ at the end of the line. Hence at the end of the operation up to this point the "600.00" has been added to the register wheels and "6 hundred dollars and 00 cents" has been set up at the setting up position of one series of check-printing wheels, and "600.00." at the other series of wheels 111ᶜ.

The check is removed from the typewriter and adjusted to the check-writer with the top edge down and the printed face to the rear against the deflector 153, with the left-hand edge against the gage 154 and the leading edge resting against the stop-pins 152. The crank-arm 120 is drawn forward from the position of Figure 6 to that of Figure 20, and during this small movement of the crank the roller 158 has passed from the control of the cam 161 and is spring-pressed against the face of the check. A further forward movement of the crank brings the several operative parts into co-operative positions, as shown at Figure 21, where the cam 166 has vibrated its ink-rollers from the supply-roller 167 to bear against the leading edges of all the type-faces at the set-up line indicated at "X"; the cam 124 has moved the arm 125, rock-shaft 126ª and the connecting parts to force the two rods 132 into a locked-down engagement with the teeth of the whole series of bars 106 and 106ª; the cutting platen-blocks 142 have passed over the individual cam-members 144 adjustably secured to the stationary shaft 138; and the cutting faces have been raised above the surface of the cylinder, as shown at Figure 21. From this point through the interlock of the rods 132 within the teeth of the rack-bars 106, said racks will move in the direction of the arrow, Figure 14, to the position of Figure 15; and the wheels 111 will have a surface travel equal to the surface travel of the check bearing cylinder; hence the set-up type-line "X" and the cutting platen-blocks will advance towards each other in unison with the check between them. The type in advancing will receive a coating of ink from the rolls 162 timed to ride off their cam 166 immediately after rolling over the type-faces (Figure 12) to return to their supply-roller. As the parts are further advanced toward the position of Figure 22, the leading edges of both type and platen will meet cornerwise and readily puncture an initial cut through the check that gradually lengthens as rotation continues and develops a rotary shearing action in cutting the whole amount line that is hardly perceptible at the crank-arm, and these cutting faces assist the rolls 158 as paper-feeding elements. In passing to the position of Figure 22, the type-faces have slit the check and have been withdrawn, and the cutting platen-blocks have passed the control of the cams 144 and have returned within the cylinder 139 through the action of their restoring springs 143, and from this point on to the end of the stroke of the crank-arm 120, the check will be fed around the cylinder, and the cam 124 will swing idly over and dwell on the arm 125, and at the end of the forward stroke, the several parts will assume the position of Figure 23, where the cam 161 has raised the rolls 158 from the cylinder and the cylinder has made one complete revolution.

To prevent any possibility of the leading edge of the check adhering to the pins 152 after passing the rolls 155, a stripping plate 172 may be secured to the frame, with the edge positioned to ride over the face of the cylinder and strip the edge of the check from the pins that pass through grooves in the plate.

When the general operator has reached the end of its forward stroke against the screws 85 and the cross-bar 80 has shifted the active indexing bars 50 to register, and as the rotation of the shafts 101 sets up corresponding values in the printing wheels 111 at a setting-up line position to be subsequently advanced as a series through the printing zone, it is obvious that means must be employed to prevent the rotation of the shafts 101 from affecting the indexing bars 50, which have already registered their values at the register wheels. To this end the seven shafts are divided into two sections 101 and 101ª and are joined together by a flexible coupling that will promote a joint rotation in one direction during one interval, and during another interval permit one section to remain inactive while the other advances in the same direction. To this end the shafts 101 have a direct connection to the selecting elements and the shafts 101ª are connected directly to the rack 106. Each shaft 101 has a sleeve 173 secured thereto by a pin 174 with the sleeve abutting the face of the bracket 104. The inner end of the shaft 101ª enters the sleeve 173 freely with the end thereof abutting the end of the shaft 101. The edge of the sleeve 173 that overhangs the shaft 101ª is stepped or notched to co-act with a pin 174ª driven transversely through the shaft to check the action of a spring 175 coiled about the sleeve with the ends secured between the two pins 174 and 174ª. The tension of the spring is against the direction of the shaft's rotation in setting up the wheels 111, and hence must be sufficiently strong to operate the wheels without flexing. When the wheels 111 are rotated through the printing zone, their associated shafts 101ª will rotate with them, and by holding or locking the shafts 101 against rotation during this interval the independent movement of each shaft 101ª is absorbed by winding up the spring 175, and at the end of the printing operation these springs will restore the wheels 111 to the setting-up position.

Means to lock the seven shaft sections are shown at Figures 2, 3, 4 and 5, where a locking bar 176 is positioned over the rack-bars 98 and given a sliding parallel up and down movement, through being mounted upon screws 177 that pass through angular slots in the bar and hold the bar against the face of a cross-bar 178 and spring-pressed in one direction by a spring 179. A curved trip-arm 180 is secured at one end of a rock-shaft 181 journaled in ears on the guides 81ª at each side frame, and provided with a spring 182 to urge the end of the trip-arm 180 against the edge of the bar 77. The rock-shaft 181 carries an arm 183 that extends rearwardly over the upper edge of the locking bar 176 and also the seven bars 60 for purposes presently to be described. At Figure 5, the rack-bar 77 of the general operator always has a uniform forward movement, and the edge thereof adjacent the end of the overlying end of the trip 180 is cut away, as at 77ª, a distance a little less than the movement of the bar, so that just before the bar has reached the end of its forward stroke the rear wall 77ᵇ of the cut-away portion will cam the end of the trip 180 and cause it to ride to the higher edge of the bar, causing the arm 183 to drop and press upon the top edge of the slide 176 and depress the lower edge into locking engagement between two adjoining teeth of the whole series of racks 98, and these racks will be locked against movement from the rotation of the shafts 101ª in both active and inactive positions.

By referring back to the check, Figure 17, it will be noted that in printing the date "a", the numerals register within the columnar zone predetermined as the active zone of the sectors for denominational units by the adjustment of the stop 48 to the stop bar 49, and hence the printing of any figures for any purpose within this zone would cause addition to take place at the register wheels. To offset this action, Figure 2, a push-key 184, through the front wall of the typewriter frame, traverses the machine where the rear free end is pivoted at 184ª to the lower end of a bell-crank 185, swinging about a pivot 186 with a short arm 185ª carrying a stud 187 to engage with an arm 188 that rocks a shaft 189 and arms 189ª carrying the roller 54 between them. By pushing in the key 184, the roller 54 is shifted out of the path of the rollers 54ª on the selectors 52, and the carriage may be moved freely through the adding zone and the selectors will remain inactive. A pin 191 projecting from the push-key 184 out through a slot 192 in the side frame will lock the key indefinitely in a pushed-in position by dropping back of a shoulder 193 formed in the slot, as shown and described in the aforesaid patent to Hart.

Figure 18:
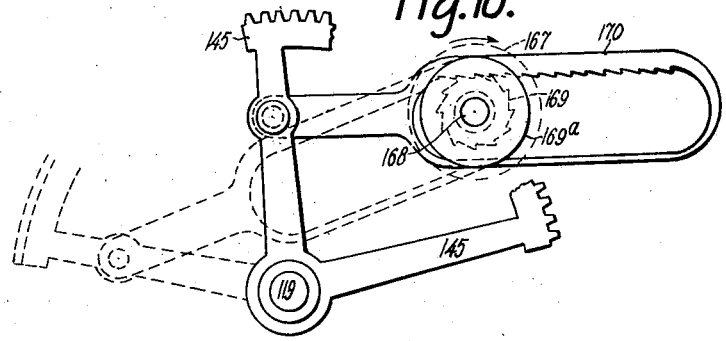
Figure 18 is a fragmentary view illustrating the manner of rotating the ink-supply roller by a connection to the driving sector.
Figure 19:
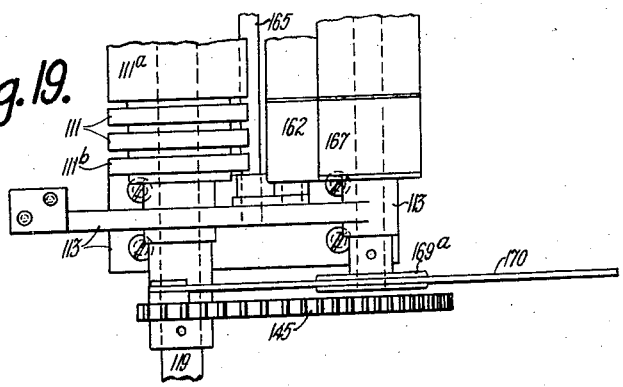
Figure 19 is a plan view, showing the parts in Figure 18 assembled in operative position to the type-wheels and ink-rollers.

On the return stroke of the crank-arm 120, the rack 170 rotates the ink-supply-roller 167, Figure 18; the pawls 148 draw back idly over the disk 150 leaving the cylinder 139 at rest, and when the cam 124 releases the arm 125 the springs 175 will rotate the shafts 101, pinions 105 and move the racks 106 forward, carrying the tie-rods 132 with them until released by the cross-bar 134. This movement is timed to arrest the pin 174, Figure 8, striking the shoulder in the edge of the sleeve 173, which restores the shaft 101ª to the control of the shaft 101. The further return movement of the crank-arm 120 is without effect except to rotate the ink-supply-roller 167 and drop the pawl 148 within the tooth of the disk 150 at the end of the stroke.

The crank-arm 83 is now moved to the rear. The initial movement drops the trip-arm 180 into the slot in one rack-bar 77 of the general operator and raises the arm 183 to the position shown at Figure 5, which releases the locking bar 176 to its spring, to withdraw the bar from the teeth of the still stationary racks 98. The forward toothed section of the bar 77, which is in train with the gears 86 and 87, will rotate the transferring element 73 to co-operate with any pinion 75 that has moved into their field during the forward stroke of the rack 50 for a carry-over register. As the forward movement of the bar 80 first picked up the pin-carrying shuttles for an independent movement of one unit dimension before the shuttles conveyed any movement to their bars 50, similarly on the return stroke of the general operator the cross-bar 79 will first pick up the pendent arm 97 of any active rack 50 and move the pin-carrying shuttle 80 one unit space to the rear and then convey a rearward movement to the bars 50 to their stop positions against the comb-plate 51. Near the end of the return movement of the general operator, the dog 94 will vibrate the cam-arm 93, rod 88 and arm 92 to lift the plate 91 against the lower ends of any depressed indexing pins 61 to force the pins upwardly to an inactive position above the field of the bar 80, and then drop the cam-arm 93 to restore the plate 91. While these restoring movements are taking place in the adding base, the shafts 101 and 101ª and pinions 105 will restore the racks 106 and rotate numeral-wheels 111, and near the end of the return stroke of the racks 106, such racks that are provided with pins 114, will engage with the pins 114ª on the rack controlling the "hundred" and "thousand" wheels, and move these wheels one unit space removed from the setting-up line position. The racks controlling the two wheels for "dollars" and "cents" are restored by their arms 116ª, Figure 15, forcing the stud 115 to the normal position shown at Figure 14, and bringing the two words into alignment with the setting-up line.

With all machines of this character, provision has always been made for an operating crank-arm that shall be spring-pressed on the return stroke, requiring a dash-pot or some other form of retarding element to check the destructive force of this spring on the complicated mechanisms. A conspicuous feature in this invention is the absence of these springs. After the setting up of the indexing pins, the crank-arm 83 is moved forwardly until checked by the general operator striking its stops, and the lever is left in this forward position. The check is removed from the typewriter and adjusted to the adjoining check-writer, and the crank-arm 120 moved forwardly against its stop 121ª, which prints and ejects the check, and the lever movement is immediately reversed not by a spring, but by a manual operation, against its normal stop 121, a full continuous movement thereof in both directions being assured by the full-stroke interlocking dog 123. The crank-arm 83 is then manually restored to its normal position against a fixed stop 190 (Figure 2) on the side wall of the frame.

From this description it will be seen that blank checks may be adjusted to these combined mechanisms to be typewritten for date, payee's name and amount; the amounts successively registered at a series of adding accumulator wheels and the amounts finally printed in both words and numerals on the check by indelibly-inked, paper-shredding, type-faces, interchangeable with blank surface-destroying elements that fill in the remainder of the amount line; that a manipulation of the numeral-keys sets up a selective mechanism, an operating lever registers digit units to the adding accumulator wheels predetermined by the denominational value printed, and simultaneously sets up equivalent values at two series of check-printing type-wheels; that the selective mechanism at each operative period rotates the adding accumulator wheels a predetermined number of digit unit distances of one to nine, and simultaneously rotates type-wheel printing elements unit-distances of one to ten; that the type-printing wheels are prematurely assembled at a normally inoperative printing position, and subsequently carried as a longitudinal unit through a fixed printing zone predetermined by a cooperating normally inoperative cutting platen movable with a rotary check-carrying cylinder, making one complete revolution at every check-printing operation; that the type-inking means comprise an ink-supply roller and an ink-distributing roller that is so timed that ink is supplied only to such type-faces that are active in the next printing operation; that the inking rollers are assembled in sections, and each alternate section saturated with a different colored ink to give a contrast between the printed numerals and the printed words on the check; that the computing and check-writing mechanisms may be cut out at will and the typewriting elements used separately; that the typewriting and computing mechanisms may be employed for a joint co-operation in typewriting and computing operations, while the check-writing elements remain inactive, except for a free rotary movement of the type-wheels between normal and setting-up positions; that the indexing pins are mounted in a carrier that has a free to-and-fro movement of one-digit dimension between fixed stop positions at the side of each digit-bar; that the general operator will pick up an active index-pin and move the pin-carrier and the racks 106 one unit distance, and then pick up the bars 50 to move in unison therewith to the end of the forward stroke; and that on the return stroke of the general operator all the active index-pins will first move the racks 106 rearwardly one unit distance and then pick up the bars 50 and all the active racks 106 will be restored in unison to normal positions.

It will also be noted that the cutting faces of the type-wheels that pierce the face of the check, through a rotary movement beyond the cutting zone, automatically strip the cutting faces from the check by rolling out of the rotary field of the check-carrier, and simultaneously the cutting platen-sections are automatically restored within the check-carrier before the printed amount line passes beyond the front pressure rolls that hold the check against the carrier, and hence the inked cut-through sections of the denominational values and the surface-destroying blank areas present clean-cut edges, and there is no tendency to tear out small divisional sections through the papers sticking to the cutting faces during the operation of stripping the check from the cutting type-faces common to some machines employing the shredding method.

Particular attention is called to the hinged hood-section "C" that may be swung back against stops to give easy access to the type-wheels for cleaning purposes, or for supplying ink to the supply rollers when required and that by turning the check-carrying cylinder by hand the cutting platen-sections may be rotated to a position to be cleaned by a brush, and then restored and timed correctly through the adjustment of the disk 150 to the driving pawl 148; and the wheels 111, as a series, may be rotated step by step by first setting all the "9" digit-pins, and then pulling the arm 83 slowly forward to successively rotate the ten cutting type-faces of each wheel through a position accessible to a cleaning brush.

It will be noted further that when the numeral keys set up index-pins for digit values in numerals, and these values are transmitted simultaneously to adding registers and numeral-printing wheels, this transmission to the adding wheels registers full denominational values, but in transmitting the values to the printing wheels these values are set up on numeral type-wheels without regard to denominational positions, and the active cutting type-wheels denote their denominational values by automatically bringing the denominational words "hundred" or "thousand" into printing alignment, and while the words "dollars" and "cents" are shown and described as fixed units in the setting-up line, it will be understood that these two wheels may be arranged to move in and out of the setting-up line similar to the words "hundred" and "thousand", in which case the normal setting-up line will present a continuous line of surface-destroying blank cutting elements; and that in adjusting the blank check to the rear of the check-carrier against fixed stops in advance of the feed-roll position, said feed-rolls become operative at such a time and in such a manner as to prevent any possibility of the check skewing out of proper alignment; said rolls becoming both feeding and paper-gripping elements to hold the check in proper relation to the rotary check-carrier.

It will further be noted that when the blank check is adjusted to the tyewriter, the first period consists in printing the typewritten matter, and without changing the carriage position, the check is removed from the platen. At the second period the left hand draws the arm 83 forward to the stop position and is held there while the check is adjusted to the rear of the check-carrier. The third period consists of moving the lever 120 forwardly and backwardly between stop positions to print the check and eject it; and the last period consists in moving the arm 83 rearwardly to restore the computing elements to normal positions. Thus the check, complete in every detail except for the signature, is typewritten, the amount registered, and the amount unchangeably shredded into the fabric of the check by these three combined mechanisms, a typewriter, a computing machine and a check-protector writing machine.

It will be noted that the numeral and word type-wheels are selectively rotated to a premature setting-up line position indicated as X in Figure 6, and the set-up type-faces are then rotated as a longitudinal unit to the position of X in Figure 22, and the arc traversed by the types between these two X positions will indicate a printing zone, and the phrases, setting the wheels for a printing assemblage, to a printing zone, and to a setting-up line, all refer to the normal position X of the type-face of Figure 6.

The extreme left-hand "hundred" and "thousand" word type-wheels 111a (Figure 4) are normally positioned to shred the check when the amount printed thereon is less than $100. If a check is to be made out for $100 or more, say $600, the numeral "6" is set up on a numeral-type-wheel 111 and adjacent this number the word-wheel 111a is set up to print the word "hundred". The word "hundred" on the word-wheel is only brought into use when its numeral-wheel 111 is set to print a number. To this end, the word-wheel is placed under the control of a spring 118 (Figure 3), but is prevented from being operated through the pins 114 and 114a on the rack-bars 106 and 106b, respectively, as long as its adjacent numeral-wheel 111 is in normal position. However, as soon as the rack 106b advances to set the numeral-wheel 111 for printing a number, the pin 114 moves away from pin 114ᵃ, and thereby permits the spring 118 to rotate the word-wheel 111ᵃ by operating the arm 116 and the rack 106ᵇ. This rotating sets the word "hundred" on the word-wheel to printing position. The return of the numeral-wheel 111, together with the rack 106, will return the rack 106ᵇ and retension the spring 118, thereby returning the word-wheel to its normal position.

After all the printing wheels are set, the lever 120 is operated manually, to rotate the check-carrier 139 through a complete revolution. This check-carrier carries the platen-sections 142, which are normally out of working position. During the rotation of the check-carrier, the platen makes a printing stroke, and is cammed out to engage the printing wheels 111 and 111ᵃ. Concomitantly means, under the control of the lever 120, starts to rotate all the wheels 111, 111ᵃ together with the check-carrier 139 and platen 142. In this manner the printing wheels will engage the platen while passing through the printing strokes, to shred the check. Further rotation of the platen and wheels disengages them, and the platen rides off from its operating cam and returns to normal ineffective position, while upon return movement of the lever 120 the typing wheels are returned to their normal positions.

Variations may be resorted to within the scope of the invention, and portions of the improvements may be used without others.

Having thus described my invention, I claim:

1. In a check-printing machine, the combination of a series of separate numeral and word printing wheels arranged in longitudinal series for printing upon the amount-line of a check, numeral-keys operable to selectively condition the wheels in printing sequence predetermined by the denominational values of the keys operated, and means for rolling a check across the printing zone of the key-selected types to simultaneously print all the selected characters upon the amount-line of the check.

2. In a check-printing machine, the combination of a series of numeral and word printing wheels arranged in longitudinal series for printing upon the amount-line of a check, numeral-keys operable to selectively condition the types of the wheels in printing sequence predetermined by the denominational value of the keys operated, a cylinder operable to rotate the check across the printing zone of the key-selected types, and a platen carried by the cylinder and operable by the rotative operation thereof with the selected types to simultaneously print the whole amount-line of the check.

3. In a check-printing machine, the combination of a series of numeral and word printing wheels arranged in longitudinal series, numeral typing keys operable to selectively condition the wheels in printing sequence predetermined by the denominational values of the keys operated, a manually-operable cylinder for rotating a check through the printing zone of the key-selected types, and a normally-inoperative platen carried by the cylinder and conditioned during the rotary movement thereof for a rotary co-operation with the selected types to print the amount upon the check.

4. In a check-printing machine, the combination of a series of numeral and word printing wheels arranged in longitudinal series, numeral typing keys operable to selectively condition the wheels in printing sequence predetermined by the denominational values of the keys operated, a manually-operable cylinder for rotating a check through the printing zone of the key-selected types, a normally-inoperative platen carried by the cylinder, and stationary cams within the cylinder to render the platen co-operative with the types during the rotation of the cylinder.

5. In a check-printing machine, the combination of printing devices including type-wheels arranged to print an amount in both numerals and words and each wheel selectively settable for a premature alignment and subsequently rotatable as a unit through a check-printing zone, a rotatable check-carrier including a cylinder, a normally-inoperative platen within the cylinder that is rendered operative during the rotation thereof, a crank-driven rock-shaft, and mechanism operative by the rock-shaft to impart a relative rotary movement to the cylinder and to the set-up type-wheels.

6. In a check-printing machine, the combination of printing devices including type-wheels arranged to print an amount in both numerals and words and each wheel selectively settable for a premature alignment and subsequently rotatable as a unit through a check-printing zone, a rotatable check-carrier including a cylinder, a normally-inoperative platen within the cylinder rendered operative during the rotation thereof, a crank-driven rock-shaft geared to the cylinder, and means operable by the rock-shaft to rotate the cylinder and impart a relative rotary movement to the type-wheels.

7. In a check-printing machine, the combination of a platen having a rotative printing stroke, check-printing elements including a denominational word type-wheel and an adjoining numeral type-wheel, both of which are normally out of printing position, a spring normally urging said word type-wheel to position to print a word, releasable means restraining said word type-wheel, racks, means for causing one of said racks to rotate the numeral type-wheel selectively to present a predetermined numeral to the platen, means concomitantly operable to release the word type-wheel for actuation by said spring, a stop for said word-wheel, manual means for subsequently driving the platen through a rotative printing stroke, and means cooperative with said driving means and effective through said racks to rotate the presented printing elements.

8. In a check-printing machine, the combination of a platen having a printing stroke, check-printing elements including denominational word type-wheels and adjoining numeral type-wheels, all of which are normally out of printing positions, springs normally urging said word type-wheels to positions to print words, releasable means restraining said word type-wheels, racks, means for causing certain of said racks to rotate the numeral type-wheels each selectively to present predetermined numerals to the platen, means automatically operable to release the associated word type-wheels for actuation by said springs, stops for said word-wheels, manual means for subsequently driving the platen through a printing stroke, and means co-operative with said driving means and effective through said racks to rotate all the presented printing wheels.

9. In a check-printing machine, the combination of a platen having a printing stroke, check-printing elements including a denominational word type-wheel and an adjoining numeral type-wheel, both wheels normally out of printing positions, a spring tending to move the word type-wheel to position to print a word, means normally restraining said word type-wheel, a rack to rotate selectively the numeral-wheel through unit-distances of "1" to "0", and means operable by said rack to release the denomination word-wheel to the driving action of its spring, to present the denomination word thereof to the platen.

10. The combination with mechanism for imprinting an amount upon a bank-check, including a series of type-wheels having check-printing types selectively settable to print an amount, and a rotatable check-carrier, of driving means having connections operable to rotate the check-carrier one check-printing revolution, and having other connections operable to rotate the selected type-wheels through the line-printing position on the check only, during its rotation with the carrier.

11. In a check-printing machine, the combination of a platen having a rotary printing zone, check-printing elements including a denominational word type-wheel and an adjoining numeral type-wheel, both normally inoperative to the printing zone, a reciprocable rack to rotate the numeral-wheel selectively to present a predetermined numeral from "1" to "0" to the printing zone, a rack to rotate the word-wheel to present the associated denominational word to the printing zone during the initial movement of the numeral-wheel rack, and manually-operable reciprocable means to engage both racks to rotate both numeral and word wheels in unison through the printing zone.

12. In a check-printing machine, the combination of check-printing elements including a rotatable driver and wheels having numeral and word printing types rotatable by the driver to print, said wheels arranged in longitudinal alignment but in separate groups to print upon the amount-line of a check, one group to print the amount of the check in numerals and words, and another group to print the amount in numerals only, and a type-inking roller operable, during the rotation of the types by the driver, to ink the whole longitudinal line of types, said roller including a built-up row of sections variably colored and spaced to ink all the numeral-types in one color and ink all the word-types in another color.

13. In a check-printing machine, the combination of check-printing elements including a rotatable driver and wheels having numeral and word printing types rotatable by the driver to print, said wheels arranged in longitudinal alignment and in two separate groups for printing upon the amount-line on a check, one group to print the amount of the check in numerals and words, and the other group to print the amount in numerals only, and a multi-color inking roller operable during the rotation of the types by the driver and operable prior to the printing of the check, to ink the longitudinal line of both groups of types, one color of ink for the numeral-types and another color for the word-types.

14. In a check-printing machine, the combination of check-printing elements including a linear series of wheels having numeral and word printing types, and a rotatable platen for simultaneously printing the whole amount-line of a check, the types selectively arranged for a longitudinal alignment of two separate groups along the amount-line, one group to print the amount of the check in numerals and words, and the other group to print the amount in numerals only, a multi-color inking roller operable by the rotation of the platen prior to the printing operation, to ink both groups of types, one color of ink for the numeral-types and another color for the word-types, and an ink-supply roller having an operative connection with the rotating platen and a rolling contact with the ink-roller for a rolling distribution of ink before each printing operation.

15. The combination of mechanism for imprinting an amount upon a check, including a set of selective type-wheels, a check-carrier including a rotatable cylinder, a crank-driven rock-shaft geared to said carrier for a one-way rotation, and type-inking rollers controlled by the movement of the carrier and operable to ink predetermined type-faces on the type-wheels immediately before the check-printing operation.

16. The combination of mechanism for imprinting an amount upon a check, including a set of key-selected type-wheels with interlocking rack-bars, a check-carrier including a rotatable cylinder, a crank-driven rock-shaft geared to the carrier for a one-way rotation, and means operated by the rock-shaft and interlocking with the type-wheel racks to rotate said type-wheels in unison with the carrier through a check-printing zone.

17. The combination of mechanism for imprinting an amount upon a check, including a set of key-selected type-wheels with interlocking rack-bars, a check-carrier including a cylinder rotatable on a fixed axle, a platen housed within the carrier, cams on the axle to time the movement of the platen to a printing position, a crank-driven rock-shaft geared to the carrier for a one-way rotation, and means operated by the rock-shaft, effective to rotate all the type-wheels in unison and time the movement of the platen therewith at a check-printing zone.

18. The combination of mechanism for imprinting an amount upon a check, including a set of key-selected type-wheels, a check-carrier including a cylinder rotatable on a fixed axle, an inoperative platen housed within the cylinder, cams on the axle to shift the platen to an operative position to co-operate with the selected type-wheels, and a crank-arm having connections operable to rotate the cylinder, platen and type-wheels to effect the printing of the check.

19. The combination of mechanism for imprinting an amount upon a check, including a set of key-selected type-wheels, a check-carrier including a cylinder rotatable on a fixed axle, an inoperative platen housed within the cylinder, cams adjustably fixed to the stationary axle to shift the platen to an operative printing position, and a crank-driven rock-shaft geared to the carrier for a positive one-way rotation, and having connections operable to bring both type-wheels and platen into rotary co-operation to print.

20. The combination of mechanism for imprinting an amount upon a check, including a set of key-selected type-wheels, a check-carrier including a cylinder rotatable on a fixed axle, an inoperative platen concealed within the cylinder, cams on the stationary axle to move the platen to an operative position above the periphery of the cylinder during the check-printing interval, and a crank-arm having connections operable to rotate the cylinder to bring the type-wheels and platen into rotary co-operation to print.

21. The combination of mechanism for imprinting an amount upon a check, including a set of key-selected type-wheels, a check-carrier including a cylinder rotatable on a fixed axle, an inoperative platen housed within the cylinder, cams on the axle to move the platen to an operative position above the periphery of the cylinder during the check-printing interval, springs to restore the platen within the cylinder when said platen is released by the cams after passing through the check-printing zone, and a crank-arm operable to rotate the cylinder, platen and type-wheels in unison within the check-printing zone.

22. The combination of mechanism for imprinting an amount upon a check, including a set of key-selected type-wheels, a check-carrier including a cylinder rotatable on a fixed axle, a platen housed within the cylinder and spring-pressed to an inoperative position, cams on the stationary axle to move the platen to an operative rotary printing position, a crank-driven rock-shaft geared to the cylinder for a one-way rotation, and means operated by the rock-shaft, effective to rotate the type-wheels through a printing zone in unison with the platen.

23. The combination of mechanism for imprinting an amount upon a check, including a series of selectively operable type-wheels, a check-carrier including a rotatable cylinder, a manually-driven rock-shaft geared to the cylinder for a one-way rotation thereof, means operable by the rock-shaft to rotate the type-wheels through a printing zone, and means operable by the rotating cylinder to ink the type-faces of the wheels before each printing operation.

24. The combination of mechanism for imprinting an amount upon a check, including a series of selectively operable type-wheels, a check-carrier including a rotatable cylinder, a crank-driven rock-shaft geared to the cylinder for a one-way rotation thereof, means operable by the rock-shaft in rotating the cylinder to rotate the type-wheels in unison through a printing zone, and normally inoperative inking means to apply ink to the type-faces before each printing operation.

25. The combination of mechanism for imprinting an amount upon a check, including a series of selectively operable type-wheels, a check-carrier including a rotatable cylinder, a crank-driven rock-shaft geared to the cylinder, means operated by the rock-shaft in rotating the cylinder to rotate the type-wheels in unison through a printing zone, and cam-controlled inking means timed to the rotation of the cylinder to apply ink to selected type-faces on the wheels before each printing operation.

26. The combination of mechanism for imprinting an amount upon a check, including a series of selectively operable type-wheels, a check-carrier including a rotatable cylinder, a crank-driven rock-shaft geared to the cylinder, means operated by the rock-shaft in rotating the cylinder to rotate the type-wheels in unison through a printing zone, a normally inoperative ink-roller normally in contact with a rotatable ink-supplying roller, and means carried by the rotatable cylinder to vibrate the inking roller from the supply roller into operative position to supply ink to selected type-faces of the wheels before each check-printing operation.

27. The combination of mechanism for imprinting an amount upon a check, including a series of selectively operable type-wheels, a check-carrier including a rotatable cylinder, a crank-driven rock-shaft geared to the cylinder for a one-way rotation, means operated by the rock-shaft in rotating the cylinder to rotate the type-wheels in unison therewith through a printing position, an ink-roller vibrated by a cam on the cylinder, to roll over the faces of the selected types, an ink-supplying roller with which the inking roller is normally in contact, and means operable by the rock-shaft to rotate the ink-supplying roller and the inking roller.

28. In a check-printing machine, the combination of check-printing elements including printing wheels that vary in letter-space area and are mounted for alignment upon a longitudinal axis, means operable to selectively bring each wheel into a predetermined amount-printing assemblage, a platen having units movable independently of one another, and arranged in longitudinal assembly, and paired respectively with said printing wheels and effective to individually adjust themselves to said printing wheels respectively in printing the amount of the check, and means for effecting rotation of said printing wheels with the units paired therewith.

29. In a bank-check-printing machine, the combination with rotatable type-wheels having check-printing types, of a rotatable check-carrier operable to roll a check into printing co-operation with the types of the wheels to print an amount upon the check, said carrier having leading-in stops to align the introductory edge of the check, normally inoperative feed-rollers rendered effective by the initial rotation of the carrier to feed the check by the rotation of the carrier, and manual means operable by a continuous motion thereof to rotate the check-carrier one revolution, to print the amount of the check, release the printed check from the feeding rollers and reposition the carrier at the check-inserting position.

30. In a bank-check-printing machine, the combination with rotatable type-wheels having check-printing types, of a rotatable check-carrier operable to roll a check into printing co-operation with the types of the wheels to print an amount upon the check, said carrier having leading-in stops to align the introductory edge of the check, normally inoperative feed-rollers rendered effective by the initial rotation of the carrier to feed the check by the rotation of the carrier, and a one-way operating lever effective by one sweep thereof to rotate the check-carrier one cycle to print the amount of the check, release the printed check from the feeding rollers and restore said carrier to its normal check-inserting position.

31. A bank-check-printing machine provided with a series of rotatable wheels having types, numeral-keys, means controlled by the keys, operable to selectively rotate the wheels and set up types thereon in amount-line check-printing sequence, and manual means operable to lock the selected types of all the wheels in alignment, said locking means operable to rotate the set-up line of types through a check-printing zone.

32. A bank-check-printing machine provided with a co-operative series of rotatable type-wheels, each wheel having a series of types selectively settable to compose a full amount-line for a check, a platen, and means operable to rotate the series of type-wheels and bring the composed types of the set-up amount-line into engagement with the platen to print the amount on the check, said means including individual racks in train with the wheels and means engageable with all the racks to rotate the type-wheels in unison.

33. In a bank-check-printing machine, the combination with a series of adjustable type-carriers provided with type-forms to print amounts used in writing checks, of a set of numeral-keys from "0" to "9", common to all the type-carriers, and means controlled by the keys, operable to progressively select the type-forms on the carriers to print different amounts.

34. In a bank-check-printing machine, the combination with a series of type-carriers provided with type-forms to print the amounts in numerals and the denominations in words in writing checks, of a single set of ten numeral-keys, common to the type-carriers, and means controlled by the ten keys, operable to selectively and progressively set up the numeral type-forms to print different amounts and automatically set up the denominational type-forms to print the same amount.

35. In a bank-check-printing machine, the combination of a linear series of rotatable wheels having blank types normally in longitudinal alignment to print and coextensive with the length of the amount-line of a check and having amount-types normally out of said printing alignment, keys having means operable to selectively rotate the wheels and displace the blank types with amount-types for an amount-line-printing sequence, and means operable to simultaneously rotate all the re-aligned typing faces to a printing zone to print the whole amount upon the check.

36. In a bank-check-printing machine, the combination with a linear series of rotatable type-carriers having types selectively settable to compose an amount-line to be printed upon a check, of a rotatable platen co-operative with the composed types of the carriers to feed the check between them to print, means to rotate the platen, and inking means rendered operable during the check-feeding rotation of the platen, to ink the composed types of the rotating carriers before the printing of each check.

37. In a bank-check-printing machine, the combination with a linear series of rotatable type-carriers having types selectively settable to compose an amount-line to be printed upon a check, of a rotatable platen co-operative with the composed types of the carriers to feed the check between them to print, means to rotate the platen, and inking means rendered operable during the check-feeding rotation of the platen, to ink the composed types of the rotating carriers before the printing of each check, said inking means including an ink-supply roller and a type-inking roller normally in rolling engagement therewith, the type-inking roller vibrated, by means on the rotating platen, to and from the composed types.

38. In a bank-check-printing machine, the combination with a linear series of rotatable type-carriers having types selectively settable to compose an amount-line to be printed upon a check, of a rotatable platen co-operative with the composed types of the carriers to feed the check between them to print, means to rotate the platen, inking means rendered operable during the check-feeding rotation of the platen, to ink the composed types of the rotating carriers before printing of each check, said inking means including an ink-supply roller and a type-inking roller normally in rolling engagement therewith, the type-inking roller vibrated, by means on the rotating platen, to and from the composed types, and means operable by the platen-rotating means to rotate the ink-supply roller and the engaging type-inking roller for a redistribution of the ink after the printing of each check.

39. A bank-check-printing machine provided with a linear series of rotatable wheels having types selectively settable to compose an amount-line to be printed upon a check, a rotatable platen co-operative with the composed types of the wheels to roll a check between the platen and types to print, and an ink-roller movable by means driven by the platen and operable to roll over the rotating line of composed types and then automatically return to a normal inoperative position.

40. In a bank-check-printing machine, the combination with a check-carrier, type-wheels having series of check-printing types selectively settable for an amount and driving means operable to rotate the carrier and the type-wheels into co-operation to print the amount upon a check, of a normally inoperative ink-roller common to all the type-wheels, and means timed to the initial actuation of the driving means, operable to shift the ink-roller to ink the selected amount-types when they are rotated by said driving means to print, and then remove the ink-roller to prevent the next advancing types of the wheels from being inked.

41. In a check-printing mechanism, the combination of rotatable wheels having normally inoperative printing types, selectively settable to print a linear amount upon a check, a normally inoperative type-inking roller common to all the wheels, an ink-supply roller normally in contact with the type-inking roller, and a reciprocable hand-lever having means operable in one direction of its movement to rotate the type-wheels to print, and having other means operable to shift the type-inking roller into and out of engagement with the rotating selected types before printing.

42. In a check-printing mechanism, the combination of rotatable wheels having normally inoperative printing types, selectively settable to print a linear amount upon a check, a normally inoperative type-inking roller common to all the wheels, an ink-supply roller normally in contact with the type-inking roller, and a reciprocable hand-lever having means operable in one direction of its movement to rotate the type-wheels to print, and having means operable to shift the type-inking roller into engagement with the rotating selected types before printing, and then restore the type-inking roller against the ink-supplying roller, and having other means operable during the return movement of the hand-lever to rotate the ink-supplying roller to redistribute ink to the type-inking roller.

43. A bank-check-printing machine provided with a plurality of wheels coextensive with the amount-line of a check and arranged end to end to rotate upon a common axle, each wheel having a series of peripheral amount-types and one blank type having no significant value, normally disposed in a longitudinal alignment, numeral-keys having means operable to individually and selectively rotate the wheels to substitute an amount-type for a blank type in the normal longitudinal alignment of the types, a rotatable platen normally inoperative to the types, and means operable to rotate the longitudinal re-alignment of the amount-types and the blank types into engagement with the rotating platen, to print upon the entire amount-line of the check the amount of the check.

44. A bank-check-printing machine provided with a series of wheels arranged end to end upon a common axle, each wheel having a lacerating type normally aligned as a series to idly lacerate and destroy the whole amount-line of the check, each wheel also having normally inoperative amount-lacerating types distributed therearound, a rotatable check-lacerating platen common to the types of the normal amount-line set-up, numeral-keys, means conditioned by the manipulation of the keys, operable to selectively substitute amount-lacerating types on the wheels in the normal amount-line set-up, and means operable to rotate the wheels and the platen in unison, the line set-up of the types co-operating with the platen to lacerate the amount of the check in the amount-line thereof.

45. A bank-check-printing machine provided with a series of wheels arranged end to end upon a common axle, each wheel having a lacerating type normally aligned as a series to idly lacerate and destroy the whole amount-line of the check, each wheel also having normally inoperative amount-lacerating types distributed therearound, a rotatable check-lacerating platen common to the types of the normal amount line set-up, numeral-keys, means conditioned by the manipulation of the keys, operable to selectively substitute amount-lacerating types on the wheels in the normal amount-line set-up, means operable to rotate the wheels and the platen in unison, and means for feeding the check between the amount-line types and the platen to simultaneously lacerate the whole amount-line of the check with the amount incorporated therein.

46. A bank-check-printing machine provided with a series of wheels arranged end to end upon a common axle, each wheel having a lacerating type normally aligned as a series to idly lacerate and destroy the whole amount-line of the check, each wheel also having normally inoperative amount-lacerating types distributed therearound, a rotatable check-lacerating platen common to the types of the normal amount-line set-up, numeral-keys, means conditioned by the manipulation of the keys, operable to selectively substitute amount-lacerating types on the wheels in the normal amount-line set-up, and means operable to rotate the wheels and the platen and feed the check between them transversely of its length, to lacerate the whole amount-line thereof simultaneously.

47. A check-printing machine provided with a series of wheels having check-printing types arranged to rotate upon an axle, a platen coextensive with the series of wheels and rotatable upon an axle parallel with the axle of the wheels, keys having means operable to selectively set up the types of the wheels for a continuous amount-line sequence, and means operable to rotate the wheels and platen and feed a blank check transversely of its length between the selected types and the platen to simultaneously print the whole amount of the check.

48. A check typing and protecting machine including a single series of typing and protecting numeral-keys, types responsive to said keys to first type an amount upon a check, means for supporting the check while being typed, indexing mechanism responsive to said keys, a series of settable check-protecting devices co-operatively associated with said indexing mechanism, subsequently operable means for causing the selected check-protecting devices to act upon the check, and means for supporting the check during the protecting operation, the recited elements being combined to effect preliminary typing of the amount upon the check for inspection thereof and subsequent actuation of the protecting devices, whose setting is predetermined by typing the amount upon the check.

49. A check typing and protecting machine including a single series of typing and protecting numeral-keys, types responsive to said keys for first typing an amount upon a check, means for supporting the check while being typed, indexing mechanism responsive to said keys, a series of settable check-protecting devices selected by and co-operatively associated with said indexing mechanism, a second supporting means for holding the check during the protecting operation, and subsequently operable means for driving said check-protecting devices to print the amount on the check.

50. A check typing and protecting machine including a single series of typing and protecting numeral-keys, types responsive to said keys for first typing an amount upon a check, means for supporting the check while being typed, indexing mechanism responsive to said keys, a series of settable check-protecting devices co-operatively associated with said indexing mechanism, a second supporting means for holding the check during the protecting operation, and means for initially driving the check-protecting devices a further distance than that predetermined by the indexing mechanism, whereby certain characters may be removed from check-protecting position prior to the check-protecting devices being operated.

51. A check typing and protecting machine including a single series of typing and protecting numeral-keys, types responsive to said keys to first type an amount upon a check, denominational selecting and indexing mechanism responsive to said keys, a series of settable check-protecting devices co-operatively associated with said indexing mechanism, a general operator associated with the indexing mechanism, and a set of connections to enable the general operator to rotate the check-protecting devices, to subsequently protect the amount of the check.

52. A check typing and protecting machine including means to first typewrite the amount on the check, mechanism for concomitantly indexing the digits to be typed on the check, and also for indexing zeros as the latter are to be typed on the check, a system of check-protecting elements having zero and digit types, said system also including an element for the word "hundred" and also an element for the word "thousand", combinative with the zero and digit types to indicate by mutilation of the check the amount for which it is drawn, each element also having a blank-mutilating type, the several blank-mutilating types normally standing in line, and each effective upon the check if its element preserves its normal position at the check-mutilating operation, whereby the entire unused length of the amount-line on the check is mutilated, means for subsequently operating said check-protecting elements in accordance with the indexed digits and zeros, and means for causing the selected check-protecting elements to mutilate the check.

53. A check typing and protecting machine including means to first typewrite the amount on the check, mechanism for concomitantly indexing the digits typed on the check, and also for indexing zeros as the latter are typed on the check, a system of check-protecting elements having zero and digit types, said system also including an element for the word "hundred" and also an element for the word "thousand", combinative with the zero and digit types to indicate by mutilation of the check the amount for which it is drawn, each element also having a blank-mutilating type, the several blank-mutilating types normally standing in line, and each effective upon the check if its element preserves its normal position at the check-mutilating operation, whereby the entire unused length of the amount-line on the check is mutilated, means for operating said check-protecting elements in accordance with the indexed digits and zeros, and subsequently operable means for causing the selected check-protecting elements to mutilate the check, each of said mutilating elements being a wheel having corrugated type-faces, means for finally rotating the selected and advanced shredding wheels for the purpose of shredding the check, said final rotating means being independent of the index-governed operating means, and a series of rotatable platen-sections matching the types on the shredding wheels and meshing therewith and rotating in company with the shredding wheels.

54. The combination with mechanism for first typewriting the amount upon a check, and indexing mechanism operatively connected thereto, of check-protecting mechanism operatively connected to said indexing mechanism to be governed thereby for imprinting the amount separately upon the check, including digits and zeros, said imprinting mechanism including a series of selective check-protecting combinative digit, zero and word types, and also including a separate set of digit and zero types, and subsequently operable means for bringing the selected types into register with one another for printing similar values at different locations on the check simultaneously, the printing at one location consisting of combined numerals and words, and the simultaneous printing at the other location consisting of the same number but expressed wholly in figures.

55. The combination with mechanism for first typewriting the amount upon a check, of mechanism operatively connected thereto, for indexing digits and zeros, and mechanism operatively connected to said indexing mechanism for subsequently imprinting the amount separately upon the check in the form of check-protecting words combined with numerals, said imprinting mechanism including a series of ten-step-figure-type devices, and also including one-step-word-type devices, said type-devices dependent upon said indexing mechanism, and each type-device having a blank check-protecting type normally in operative position; and each blank type being automatically displaceable by a check-protecting word or numeral printing type as predetermined by the indexing mechanism.

56. The combination with mechanism for first typewriting the amount upon a check, of mechanism operatively connected thereto, for indexing digits and zeros, mechanism operatively connected to said indexing mechanism for subsequently imprinting the amount separately upon the check in the form of check-protecting words combined with numerals, said imprinting mechanism including a series of ten-step-figure-type devices, and also including one-step-word-type devices, said type-devices dependent upon said indexing mechanism, and each type-device having a blank check-protecting type normally in operative position; and each blank type being automatically displaceable by a check-protecting word or numeral printing type as predetermined by the indexing mechanism, a rotary check-carrier including platen-sections stationary during the indexed rotation of said type-devices, and means to cause the platen-sections to rotate constantly with their respective type-devices to automatically co-operate with the type-devices, at their final rotation, to imprint the amount upon the check.

57. The combination of mechanism for first typewriting the amount upon a check, digit and zero indexing mechanism operatively connected thereto, check-protecting mechanism operatively connected to be set up by said indexing mechanism preparatory to reprinting the amount separately upon the check, the reprinting mechanism including a plurality of individually rotatable check-protecting printing wheels controllable by said indexing mechanism for printing values in combined numerals and words, a rotatable check-carrier stationary during the preparatory rotation of the printing wheels, a plurality of normally inoperative sectional platens rotatable with the carrier, and manually-operable means for subsequently rotating the carrier and for effecting an intermittent co-operation between the set-up check-protecting printing wheels and the platens during the rotation of the carrier.

58. The combination of mechanism for first typewriting the name and amount upon a check, digit and zero indexing mechanism operatively connected thereto, and check-protecting mechanism governed by said indexing mechanism for subsequently reprinting the amount separately upon the check, the reprinting mechanism including check-protecting numeral-type wheels controlled by said indexing mechanism, for printing digits and zeros, and also including check-protecting word-printing wheels, each automatically controlled by the adjacent numeral-printing wheel of the same denomination.

59. The combination of mechanism for first typewriting the amount upon a check, digit and zero indexing mechanism operatively connected thereto, check-protecting mechanism governed by said indexing mechanism for subsequently reprinting the amount in duplicate upon the check at two separate reprinting locations, said check-protecting mechanism including a series of check-protecting type-wheels employing both numerals and words in combination, and also including another set of type-wheels employing numerals only, and means for operating both series of wheels simultaneously in accordance with the presetting of the indexing mechanism.

60. The combination of mechanism for first typewriting the amount upon a check, digit and zero indexing mechanism operatively connected thereto, check-protecting mechanism controlled by the indexing mechanism for subsequently reprinting the typed amount separately upon the check, the reprinting mechanism including a series of check-protecting word-type wheels combined with numeral-type wheels controllable by the indexing mechanism, and manually-operable means for simultaneously effecting a longitudinal realignment of the whole series of type-wheels as indexed and for effecting the reprinting thereby of the amount first typed.

61. The combination of mechanism for first typewriting the amount upon a check, mechanism for subsequently imprinting the amount separately upon the check, said imprinting mechanism including a set of selective rotatable printing wheels, a check-carrier comprising a cylinder rotatable on a fixed axle, and a crank-arm having means for rotating the cylinder through one cycle at each forward stroke of said arm, and simultaneously rotating the printing wheels to impress the amount upon the check.

62. The combination with mechanism for first typewriting the amount upon a check, and indexing mechanism operatively connected thereto, of check-protecting reprinting mechanism controlled by the indexing mechanism for subsequently reprinting in duplicate the typed amount at different positions simultaneously on the amount-line on the check, said reprinting mechanism including a complete set of check-protecting numeral-type wheels and also including a set of combined numeral and word printing check-protecting wheels, and means for simultaneously rotating all of the printing wheels to reprint the amount typed on the check.

63. The combination of mechanism for first typewriting the amount upon a check, digit and zero indexing mechanism operatively connected thereto, check-protecting mechanism operatively connected to said indexing mechanism for subsequently reprinting the typed amount separately upon the check, including a series of type-wheels coextensive with the length of the amount-line on the check, each wheel having a blank check-mutilating face in normal operative position, the blank faces being displaceable by numeral and word check-mutilating type-faces on the wheels, means for selectively positioning the numeral and word type-faces at the check-printing line by said indexing mechanism, and manual means for rotating the set-up check-protecting amount-line through a check-printing zone.

64. The combination of mechanism for first typewriting the amount upon a check, digit and zero indexing mechanism operatively connected thereto, check-protecting mechanism operatively connected to be set according to the indexing mechanism preparatory to reprinting the amount upon the check, the reprinting mechanism including a series of check-protecting combined word and numeral type-wheels selectively controlled by the indexing mechanism, and manually-operable means effective to bring the whole series of selectively positioned type-wheels into longitudinal alignment and subsequently rotate the wheels as a unit through a check-protecting printing zone.

65. A check typing and protecting apparatus including, in combination, a key-operated typing mechanism including numeral-keys for typing the amount of a check, digit and zero indexing mechanism operable by said numeral-keys, and check-reprinting mechanism including word-selecting printers combined with numeral-selecting printers, all of said selecting printers being controlled by said indexing mechanism.

HERBERT H. STEELE.